United States Patent
Lee et al.

(10) Patent No.: US 12,030,352 B2
(45) Date of Patent: Jul. 9, 2024

(54) METHOD OF MANUFACTURING A HYBRID DIP CORD HAVING EXCELLENT FATIGUE RESISTANCE

(71) Applicant: HYOSUNG ADVANCED MATERIALS CORPORATION, Seoul (KR)

(72) Inventors: Kyoung Ha Lee, Anyang (KR); Jin Kyung Park, Yongin (KR); Yoon Hee Nam, Seoul (KR)

(*) Notice: Subject to any disclaimer, the term of this patent is extended or adjusted under 35 U.S.C. 154(b) by 0 days.

(21) Appl. No.: 18/101,117

(22) Filed: Jan. 25, 2023

(65) Prior Publication Data

US 2023/0219372 A1 Jul. 13, 2023

Related U.S. Application Data

(62) Division of application No. 16/464,350, filed as application No. PCT/KR2017/013279 on Nov. 21, 2017, now abandoned.

(30) Foreign Application Priority Data

Dec. 2, 2016 (KR) .................. 10-2016-0163359
Dec. 2, 2016 (KR) .................. 10-2016-0163361
Dec. 2, 2016 (KR) .................. 10-2016-0163362

(51) Int. Cl.
*B60C 9/00* (2006.01)
*C08L 77/02* (2006.01)

(52) U.S. Cl.
CPC .............. *B60C 9/005* (2013.01); *C08L 77/02* (2013.01); *B60C 2009/0092* (2013.01)

(58) Field of Classification Search
CPC .................. B60C 9/005; B60C 2009/0071
See application file for complete search history.

(56) References Cited

U.S. PATENT DOCUMENTS

| | | | |
|---|---|---|---|
| 9,617,663 B2 * | 4/2017 | Jeon | D02G 3/40 |
| 2014/0223879 A1 * | 8/2014 | Lee | D06M 15/41 |
| | | | 57/241 |
| 2015/0246580 A1 * | 9/2015 | Sevim | B60C 9/1807 |
| | | | 442/182 |

FOREIGN PATENT DOCUMENTS

| | | |
|---|---|---|
| DE | 102013223573 A1 | 5/2015 |
| EP | 3112185 A1 | 1/2017 |
| WO | 2014102672 A1 | 7/2014 |

* cited by examiner

*Primary Examiner* — S. Behrooz Ghorishi
*Assistant Examiner* — Alexander A Wang

(57) ABSTRACT

Provided is a method of manufacturing a hybrid dip cord, which includes: a step of preparing one nylon 6,6 yarn or nylon 6 yarn and one aramid yarn; a step of producing a primarily twisted yarn by applying a twist of 200 to 500 TPM by inputting one nylon 6,6 or nylon 6 yarn longer than the aramid yarn; a set of cabling the primarily twisted yarn as two to apply a twist of 200 to 500 TPM to thereby produce a raw cord; and a step of dipping the raw cord in an adhesive liquid and heat-treat the raw cord, in which the nylon 6,6 or nylon 6 is heat-shrunk so that the length of the nylon 6,6 or the nylon 6 becomes equal to the length of the aramid yarn.

4 Claims, 3 Drawing Sheets

METHOD OF MANUFACTURING A HYBRID DIP CORD HAVING EXCELLENT FATIGUE RESISTANCE

CROSS-REFERENCE TO RELATED APPLICATIONS

This application is a divisional application of U.S. patent application Ser. No. 16/464,350, filed on May 28, 2019 and claims priority to Korean Patent Application Nos. 10-2016-0163359, 10-2016-0163361, and 10-2016-0163362, filed on Dec. 2, 2016. Each of these applications is hereby incorporated by reference in their entirety into the present application.

BACKGROUND

Field

Exemplary embodiments of the present invention relate to a high strength tire cord using nylon 6,6 or nylon 6 yarn and an aramid yarn, a radial pneumatic tire using the same, and a manufacturing method thereof.

Related Art

In recent years, the performance of tires has been continuously improved according to improvement of road environments and the performance of vehicles. Especially, as the weight of vehicles increases and the limit speed increases, safety is more importantly considered as a quality factor of tires. The safety standards of tires are also being changed in accordance with the increasing demand for safety of tires. Researches on methods for imparting safety of tires are also being actively conducted in the tire industry.

Generally, a tire cord is made by twisting a yarn of the same kind to make a raw cord, and this is immersed in a dipping solution and then heat treated to form a dip cord. Herein, a hybrid cord means a cord made by twisting different kinds of yarns to express characteristics of different kinds of yarns.

On the other hand, generally, when the number of twists is increased at the step of imparting twist to the yarn, the strength is lowered, and the elongation at specific load and the elongation at break increase, and the fatigue resistance increases. When the number of twists is decreased, the strength increases, the elongation at specific load and the elongation at break decrease, and the fatigue resistance decreases.

A twist is applied to respective yarns (plys), and the yarns are cabled to be generated as a raw cord. A pre-twist is applied to the plys in order to prevent a double twist when cabled.

When a raw cord is prepared by twisting same kinds of yarns, the twisting conditions between plys are generally set to be the same, but in the case of the hybrid cord, the twisting condition may be set to be different for each ply so as to adjust the properties of the raw cord or even the dip cord.

In the hybrid cord, conventionally, there has been a method of imparting different numbers of twists to different kinds of yarns among the methods of varying the twist conditions for each of the different kinds of yarns That is, on condition that when a fiber yarn (for example, aramid yarn) having high modulus and low elongation at break is Z-twisted, the twist number is smaller than the twist number when it is S-twisted, and when a fiber yarn with low modulus and high elongation at break (such as nylon yarn) is Z-twisted, the twist number is the same as the twist number when it is S-twisted, since the high modulus fiber yarn has the Z-twist number smaller than the S-twist number after the S-twist, the twist is applied in the twist direction of the S-twist, but since, in the low modulus fiber, the Z-twist number is the same as the S-twist number, the twist is not applied, thereby showing the effect of lowering the initial modulus of the raw cord. However, such a technology can be applied only to a cabler (DRT, RT) to which a S-twist is applied, and cannot be used in a direct cabler in which both S-twist and Z-twist simultaneously occur.

In general, polyethylene terephthalate is widely used as a pneumatic radial tire, more specifically, as a carcass ply material of a pneumatic radial tire having a flatness ratio of 0.65 to 0.82. In addition, rayon is often used as a carcass ply reinforcing material for a high-speed pneumatic radial tire having a low flatness ratio, more specifically, a flatness ratio of less than 0.70.

Recently, some polyethylene naphthalate has been used for radial tires for a high speed having a low flatness ratio. However, polyethylene naphthalate is superior to polyethylene terephthalate in terms of high-temperature properties and shape stability, but it has not been widely used due to its high price. U.S. Pat. No. 6,601,378 has proposed a hybrid cord made by twisting a wound yarn of polyethylene terephthalate and polyethylene naphthalate, respectively. Polyethylene naphthalate fibers have a significantly higher modulus than polyethylene terephthalate fibers. Due to such differences in physical properties, when one of each of the wound yarns of polyethylene terephthalate and polyethylene naphthalate is twisted, it causes unevenness of tension in the raw cord. Due to such a problem, the strength utilization ratio at the time of twisting and dipping is rapidly deteriorated.

SUMMARY

The present invention has been made to solve the above-mentioned problems, and an object of the present invention is to provide a method for producing a hybrid cord using nylon 6,6 or nylon 6 yarn and aramid yarn, in which in the step of twisting the raw cord in the direct cabler where the S-twist and the Z-twist simultaneously occur, aramid yarn is used longer than nylon 6,6 or nylon 6 yarn to give a suitable twist to thereby produce primarily twisted yarns, and by twisting the primarily twisted yarns, a raw cord having an improved fatigue resistance is provided.

Another object of the present invention is to provide a hybrid dip cord for a carcass ply or cap ply layer of a pneumatic radial tire having a certain degree of fatigue resistance, which is produced by dipping the raw cord using the nylon 6,6 or nylon 6 yarn and the aramid yarn in a dipping solution and then heat-treating the raw cord.

Another object of the present invention is to provide a method for producing a hybrid cord using nylon 6,6 yarn and aramid yarn, in which nylon 6,6 yarn or nylon 6 and aramid yarn are pre-twisted by using one selected from the group consisting of a method of controlling the tension applied to the live cord, a method of adjusting the heat treatment temperature, and a method of controlling the heat treatment time, and they are cabled to make a raw cord, then the raw cord is dipped in an adhesive and is then heat-treated to thereby produce a dip cord in which nylon 6,6 or nylon 6 has been further shrunk. Therefore, hybrid dip cords, characterized in that the aramid yarn is longer than nylon 6,6 when the dip cord is untwisted, are produced.

Another object of the present invention is to provide a hybrid dip cord for a carcass ply or cap ply layer of a pneumatic radial tire having a certain degree of fatigue resistance, in which the nylon 6,6 or nylon 6 yarn is made to shrink more, by immersing the raw cord using the nylon 6,6 or nylon 6 yarn and the aramid yarn in a dipping solution and then heat-treating the raw cord.

Another object of the present invention is to provide a high strength hybrid dip cord for radial pneumatic tires, in which nylon 6,6 or nylon 6 yarn and aramid yarn were subjected to appropriate twisting and nylon 6,6 or nylon 6 is used longer than the aramid yarn to thereby shrink nylon 6,6 and nylon 6 by heat, by which the lengths of nylon 6,6 or nylon 6 and the aramid yarn become the same when untwisted.

Another object of the present invention is to provide a hybrid dip cord for a carcass ply or cap ply layer of a pneumatic radial tire having a high initial modulus value by shrinking nylon 6,6 or nylon 6 yarns by heat to thereby make the length of nylon 6,6 or nylon 6 yarns equal to that of the aramid yarn.

According to one preferred embodiment of the present invention, when one nylon 6,6 yarn or nylon 6 yarn and one aramid yarn are pre-twisted respectively and are cabled, a raw cord is generated and when the raw cord is untwisted, a hybrid raw cord, characterized in that the aramid yarn was input 5 to 100 mm/m longer than nylon 6,6 yarn or nylon yarn 6, is provided.

According to a preferred embodiment of the present invention, when the raw cord is untwisted, the aramid yarn is inserted in a length of 5 to 50 mm/m longer than that of nylon 6,6 or nylon 6 yarn.

According to another preferred embodiment of the present invention, when the raw cord is untwisted, the aramid yarn is inserted in a length of 10 to 30 mm/m longer than that of nylon 6,6 or nylon 6 yarn.

According to another preferred embodiment of the present invention, the hybrid dip cord is manufactured by dipping the raw cord into an adhesive liquid.

According to another preferred embodiment of the present invention, the fatigue resistance of the hybrid dip cord is 80% or more.

According to another preferred embodiment of the present invention, in a radial pneumatic tire including a pair of parallel bead cores, one or more layers of radial carcass layer wound around the bead core, a belt layer laminated on the outer peripheral side of the carcass layer and a belt-reinforcing layer in the circumferential direction formed on the outer peripheral side of the belt layer, A radial pneumatic tire, in which the carcass layer includes the hybrid dip cord and the carcass layer is used as one or two layers, is provided.

According to another preferred embodiment of the present invention, in a radial pneumatic tire including a pair of parallel bead cores, one or more layers of radial carcass layer wound around the bead core, a belt layer laminated on the outer peripheral side of the carcass layer and a belt-reinforcing layer in the circumferential direction formed on the outer peripheral side of the belt layer, The cap ply as the belt reinforcing layer includes the hybrid dip cord, and the cap ply is used as one or two layers.

According to another preferred embodiment of the present invention, a method of manufacturing a hybrid dip cord for a radial pneumatic tire includes a step of preparing one nylon 6,6 yarn or nylon 6 yarn and one aramid yarn;

a step of producing a primarily twisted yarn by applying 200 to 500 TPM twist respectively by inputting the one aramid yarn longer than the nylon 6,6 yarn or the nylon 6 yarn;

a step of producing a raw cord by applying 200 to 500 TPM twist by combining the primarily twisted yarn as two yarns; and a step of dipping the raw cord in a dipping solution, and then heat-treating the raw cord to produce a dip cord, in which the aramid yarn is 5 to 100 mm/m longer than nylon 6,6 yarn or nylon 6 yarn.

According to another preferred embodiment of the present invention, the fineness of the nylon 6,6 yarn or the nylon 6 yarn and the aramid yarn are respectively 500 to 3000 denier.

According to another preferred embodiment of the present invention, in order to produce a hybrid dip cord, one nylon 6,6 or nylon 6 yarn and one aramid yarn are pre-twisted and are then cabled to produce a raw cord; and the raw cord is dipped in a dipping solution and then heat-treated to thereby make the length of the nylon 6,6 or nylon 6 yarn to be shorter than that of the aramid yarn.

According to another preferred embodiment of the present invention, when producing a hybrid dip cord, shrinking yarns to make the length of the nylon 6,6 or nylon 6 yarn to be shorter than that of the aramid yarn is performed by using one selected from the group consisting of a method of controlling the tension applied to the raw cord, a method of adjusting the heat treatment temperature, and a method of controlling the heat treatment time.

According to another preferred embodiment of the present invention, the hybrid dip cord is characterized in that the aramid yarn is 5 to 100 mm/m longer than the nylon 6,6 or nylon 6 yarn when the dip cord is untwisted.

According to another preferred embodiment of the present invention, the hybrid dip cord is characterized in that the aramid yarns are 10 to 30 mm/m longer compared to nylon 6,6 or nylon 6 yarns when the dip cord is untwisted.

According to another preferred embodiment of the present invention, the hybrid dip cord is characterized in that its fatigue resistance is 85% or more.

According to another preferred embodiment of the present invention, a method of manufacturing hybrid dip cords for radial pneumatic tires includes: a step of preparing a primarily twisted yarn by imparting a twist of 200 to 500 TPM respectively to one nylon 6,6 or nylon 6 yarn and one aramid yarn; a step of producing a raw cord by cabling the primarily twisted yarn in two, and twisting the twisted yarn in a twist of 200 to 500 TPM; and a step of dipping the raw cord in a dipping solution and then heat-treating the raw cord to shrink the nylon 6,6 or nylon 6 yarn so that the length of the nylon 6,6 or the nylon 6 yarn becomes shorter than that of the aramid yarn.

According to another preferred embodiment of the present invention, a method of producing a hybrid dip cord for radial pneumatic tires uses one selected from the group consisting of a method of controlling the tension applied to the raw cord, a method of adjusting the heat treatment temperature, and a method of controlling the heat treatment time.

According to another preferred embodiment of the present invention, a method of manufacturing hybrid dip cords for radial pneumatic tires is characterized in that the tension is adjusted through the speed of the feed roller and the winding roller, the heat treatment temperature is 130 to 240° C., and the heat treatment time is from 50 to 90 seconds.

According to another preferred embodiment of the present invention, a method of manufacturing a hybrid dip cord for a radial pneumatic tire is characterized in that the aramid yarn is 5 to 100 mm/m longer than the nylon 6,6 or nylon 6 yarn when the dip cord is untwisted.

According to another preferred embodiment of the present invention, a method of manufacturing a hybrid dip cord for a radial pneumatic tire is characterized in that the aramid yarn is 10 to 30 mm/m longer than the nylon 6,6 or nylon 6 yarn when the dip cord is untwisted.

According to another preferred embodiment of the present invention, the hybrid dip cord production method for a radial pneumatic tire is characterized in that the fineness of nylon 6,6 or nylon 6 yarn and aramid yarn is respectively 500 to 3000 denier.

According to another preferred embodiment of the present invention, in a radial pneumatic tire including a pair of parallel bead cores, one or more layers of radial carcass wound around the bead core, a belt layer piled on the outer peripheral side of the carcass layer and a circumferential belt-reinforcing layer formed on the outer peripheral side of the belt layer, a carcass ply or belt layer includes a hybrid dip cord and may be formed of one or two layers.

According to another preferred embodiment of the present invention, in a radial pneumatic tire including a pair of parallel bead cores, one or more layers of radial carcass layer wound around the bead core, a belt layer laminated on the outer peripheral side of the carcass layer and a belt-reinforcing layer in the circumferential direction formed on the outer peripheral side of the belt layer, The cap ply as the belt reinforcing layer includes the hybrid dip cord, and the cap ply is used as one or two layers.

According to another preferred embodiment of the present invention, when one nylon 6,6 yarn or nylon 6 yarn and one aramid yarn are pre-twisted respectively and are cabled, a raw cord is generated and when the raw cord is untwisted, a hybrid raw cord, characterized in that the aramid yarn was input 5 to 100 mm/m longer than nylon 6,6 yarn or nylon yarn 6, is provided. Further, when the dip cord, which is generated by heat-treating the raw cord, is untwisted, the nylon 6,6 yarn or the nylon 6 yarn are shrunk by heat treatment to make the length of the nylon 6,6 yarn or the nylon 6 yarn be the same as that of the aramid yarn, to thereby produce a hybrid dip cord.

According to another preferred embodiment of the present invention, the hybrid dip cord of the present invention is characterized in that nylon 6,6 or nylon 6 yarn is shrunk by adjusting the tension or temperature during the heat treatment of the raw cord.

According to another preferred embodiment of the present invention, the hybrid dip cords of the present invention are characterized in that nylon 6,6 or nylon 6 yarns are inserted 7 to 50 mm/m longer than that of aramid yarns when the raw cord is untwisted.

According to another preferred embodiment of the present invention, the hybrid dip cords of the present invention are characterized in that nylon 6,6 or nylon 6 yarns are inserted 10 to 30 mm/m longer than that of aramid yarns when the raw cord is untwisted.

According to another preferred embodiment of the present invention, the hybrid dip cord of the present invention is characterized by having a strength of 40 kg or more and an elongation at specific load of 3.8% or less.

According to another preferred embodiment of the present invention, in a radial pneumatic tire including a pair of parallel bead cores, one or more layers of radial carcass layer wound around the bead core, a belt layer laminated on the outer peripheral side of the carcass layer and a belt-reinforcing layer in the circumferential direction formed on the outer peripheral side of the belt layer, The cap ply as the belt reinforcing layer includes the hybrid dip cord, and the cap ply is used as one or two layers.

According to another preferred embodiment of the present invention, in a radial pneumatic tire including a pair of parallel bead cores, one or more layers of radial carcass layer wound around the bead core, a belt layer laminated on the outer peripheral side of the carcass layer and a belt-reinforcing layer in the circumferential direction formed on the outer peripheral side of the belt layer, The carcass layer includes the hybrid dip cord, and the carcass layer is used as one or two layers.

According to another preferred embodiment of the present invention, there is provided a method of manufacturing a hybrid dip cord for a radial pneumatic tire, including:

Preparing one nylon 6,6 yarn or nylon 6 yarn and one aramid yarn;
- a step of producing a primarily twisted yarn by applying 200 to 500 TPM twist respectively by inputting the nylon 6,6 yarn or the nylon 6 yarn longer than the one aramid yarn;
- a step of producing a raw cord by applying 200 to 500 TPM twist by combining the primarily twisted yarn as two yarns; and
- a step of dipping the raw cord in an adhesive liquid and performing heat treatment, in which in the step of producing the primarily twisted yarn, one nylon 6,6 or nylon 6 yarn is input longer by 5-100 mm/m than one aramid yarn, and the nylon 6,6 yarn or the nylon 6 yarn is thermally shrunk so that the length of the nylon 6,6 yarn or the nylon 6 yarn becomes equal to the length of the aramid yarn during the heat treatment.

According to another preferred embodiment of the present invention, the fineness of the nylon 6,6 yarn or the nylon 6 yarn and the aramid yarn are respectively 500 to 3000 denier.

The present invention allows aramid yarn to be inserted longer than into nylon yarn and allows the elongation at specific load and the elongation at break to become higher, to thereby cause an increase in the fatigue resistance, by which the initial deformation in the tensile test causes low modulus to be generated by nylon, and a high modulus can be expressed from the section where the aramid yarn begins to has strength. As such, in the vulcanization, when the green tires are inflated with the bladder in the mold, it allows easy deformation and tires can be easily manufactured.

According to the present invention, it is possible to overcome the disadvantage that it is difficult to deform in a mold with a high modulus when using the aramid alone, and it is possible to improve low fatigue resistance and adhesion which are problematic when using aramid alone, and it is possible to produce high performance tires by improving low modulus and heat resistance that are problematic when using nylon 6,6 or nylon 6 alone.

Further, in the present invention, twist numbers of aramid yarn and nylon yarn are kept the same during twisting, to thereby allowing a heat treatment process after producing a raw cord, by which the nylon yarn shrinks, and the aramid yarn is set to be longer than the nylon yarn per unit length when the dip cord is untwisted, thereby increasing the fatigue resistance. During tensile test, the initial deformation can cause generation of low modulus by nylon and can cause high modulus from the section where the aramid begins to have force. As such, in the vulcanization, when the green tire is inflated into the bladder in the mold, it allows easy deformation and tires can be easily manufactured. According to the present invention, it is possible to overcome the disadvantage that it is difficult to deform in a mold with a high modulus when using the aramid alone, and it is possible to improve low fatigue resistance and adhesion which are problematic when using aramid alone, and it is possible to produce high performance tires by improving low modulus and heat resistance that are problematic when using nylon alone.

Further, the hybrid dip cord of the present invention allows the length of nylon 6,6 or nylon 6 having a high elongation to be the same as that of the aramid yarn having a high initial modulus even after shrunk by heat, by which the breaking time of the nylon 6,6 yarn or the nylon 6 yarn and the aramid yarn can be set to be the same, thereby improving strength ratio of the cord.

According to the present invention, satisfactory results can be obtained with respect to noise reduction and steering stability of the tire by applying hybrid dip cord made of nylon 6,6 or nylon 6 and aramid yarn of the present invention to the carcass ply and the cap ply of the pneumatic radial tire.

DETAILED DESCRIPTION OF THE EXEMPLARY EMBODIMENTS

Figure 1:
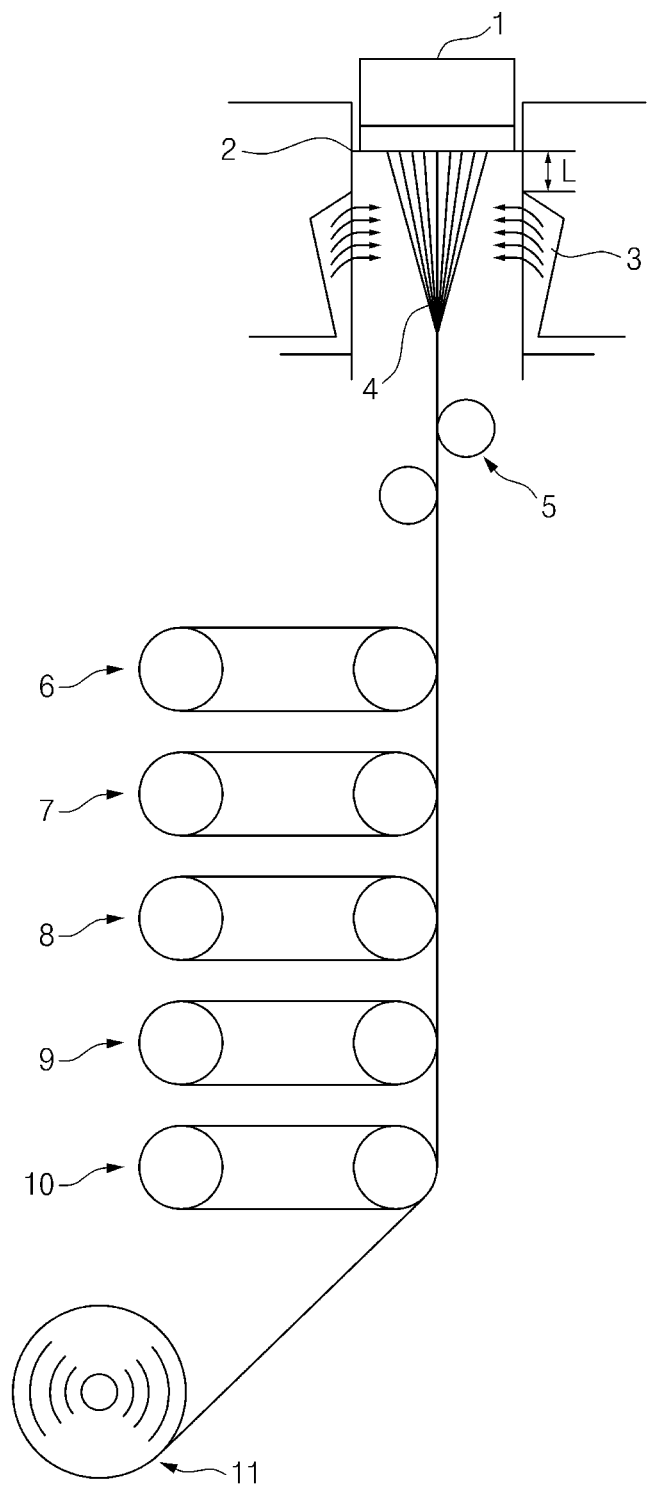
FIG. 1 schematically shows spinning and drawing processes of nylon 6,6 yarn or nylon 6 yarn according to the present invention.
Figure 2:
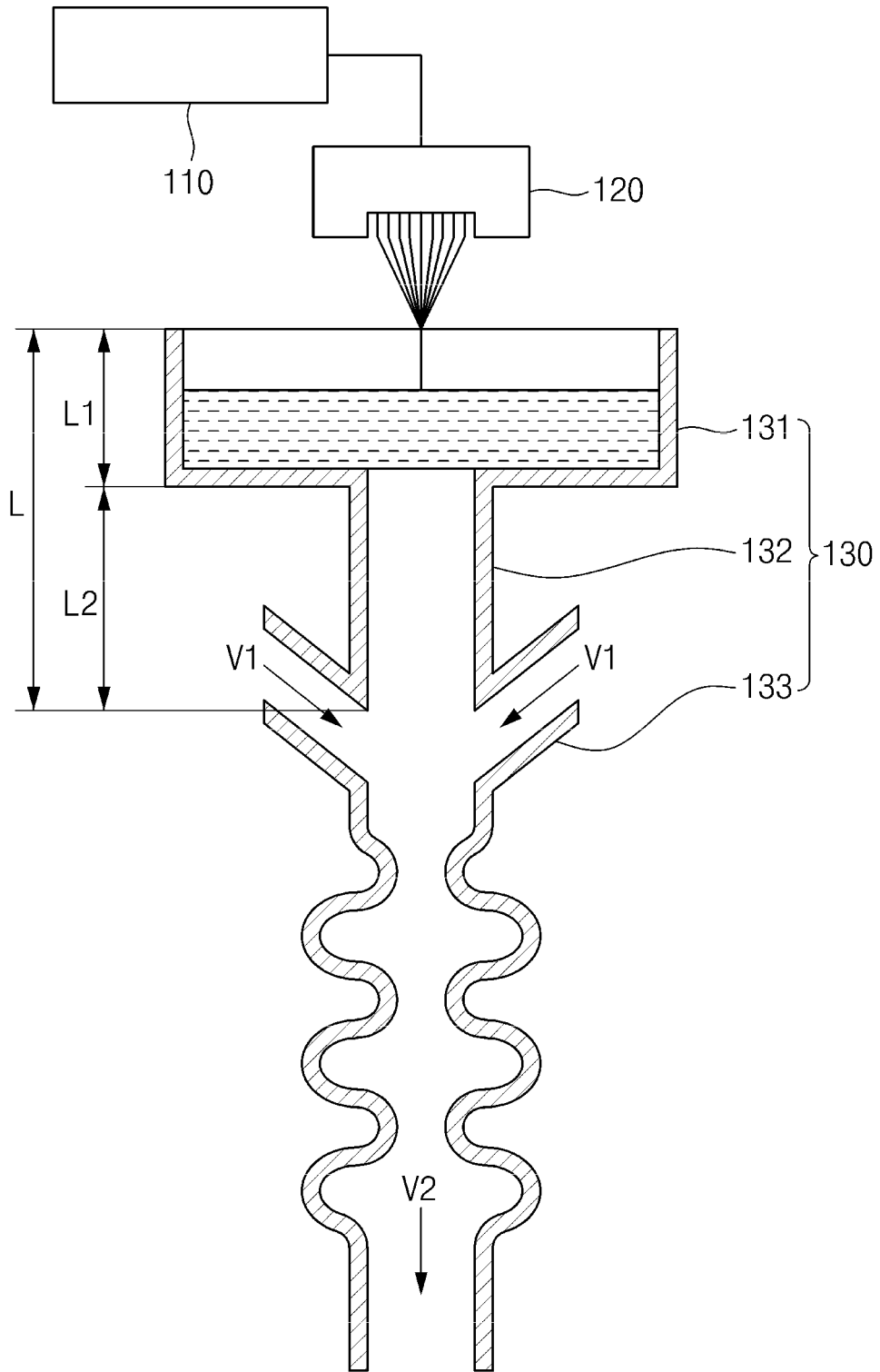
FIG. 2 schematically shows a manufacturing process of an aramid yarn according to the present invention.

The present invention will be described in detail below with reference to the accompanying drawings. The embodiment described herein does not limit the scope of the present invention, but is merely an example, and various modifications can be made without departing from the technical idea of the present invention.

The aramid yarn and the nylon 6,6 or nylon 6 yarn for producing the hybrid dip cord according to the present invention are produced through the following process.

First, a manufacturing method of nylon yarn used in the present invention will be described in detail with reference to the accompanying drawings.

The nylon used in the production of the hybrid tire cord of the present invention contains an amide group having a strong polarity in the main chain and has stereoregularity and symmetry to thereby have crystalline. Generally, a polyamide refers to a generic term of a polymer linked by an amide bond (—CONH—), which can be obtained by condensation polymerization of a diamine and a bivalent acid. Polyamides are characterized by amide bonds in the molecular structure, and their physical properties vary depending on the ratio of amide groups. For example, when the ratio of amide groups in the molecule is increased, specific gravity, melting point, absorbency, rigidity and the like are increased.

In addition, polyamide is a material used in a wide range of fields such as clothing, tire cord, carpet, rope, computer ribbon, parachute, plastic and adhesive due to its excellent resistance to corrosion, abrasion resistance, chemical resistance and insulation.

Generally, polyamides are classified into aromatic polyamides and aliphatic polyamides. Representative aliphatic polyamides include nylon. Nylon is originally a trademark of DuPont, Inc., but is now used as a generic name.

Nylon is a hygroscopic polymer and is sensitive to temperature. Representative nylons include nylon 6, nylon 6,6, and nylon 46.

First, nylon 6 is characterized by excellent heat resistance, moldability and chemical resistance, and is produced by ring-opening polymerization of ε-caprolactam in order to produce nylon 6. Nylon 6 means that caprolactam has 6 carbon atoms.

(Reaction formula 1) Nylon 6 polymerization of caprolactam

On the other hand, nylon 6,6 is generally similar in properties to nylon 6, but is superior in heat resistance to nylon 6, and has excellent self-extinguishing and abrasion resistance. Nylon 6,6 is prepared by dehydration condensation polymerization of hexamethylenediamine and adipic acid.

(Reaction formula 2) Nylon 6,6 polymerization by dehydration condensation polymerization reaction of hexamethylenediamine and adipic acid The polyhexamethylene adipamide polymer contains at least 85 mole percent hexamethylene adipamide repeat units, preferably only hexamethylene adipamide units.

Alternatively, optional polyamide homopolymers and copolymers may be used in place of polyhexamethylene adipamide. Such polyamides can be predominantly aliphatic. Poly (hexamethylene adipamide) (nylon 6,6); poly (ε-caproamide) (nylon 6); and most commonly used nylon polymers such as their copolymers can be used, but nylon 6,6 is most preferred.

In order to improve the thermal stability during the production of the polyhexamethylene adipamide chip, the residual amount of the copper metal in the final polymer may be 20 to 50 ppm. If this amount is less than 20 ppm, the thermal stability is lowered during the spinning and pyrolysis occurs. If it exceeds 50 ppm, more than necessary copper metal acts as a foreign substance, which may be a problem in spinning. The prepared polyhexamethylene adipamide chips are made of fibers by the device shown in FIG. 1.

Referring to FIG. 1, the polyhexamethylene adipamide chips are subjected to low temperature melt spinning through the pack 1 and the nozzle 2, preferably at a spinning temperature of 270 to 310° C., preferably with the spinning draft ratio of 20 to 200 (linear velocity on the first winding roller/linear velocity on the nozzle). This process is intended to prevent a decrease in the viscosity of the polymer due to thermal decomposition. If the spinning draft ratio is less than 20, the uniformity of the filament cross section may be deteriorated to thereby deteriorate the drawability. If it exceeds 200, filament breakage may occur during spinning, thereby making it difficult to produce normal yarns.

The filtration residence time in the pack of chips in the melt spinning process should be adjusted to 3 to 30 seconds. If the filtration retention time in the pack is less than 3 seconds, the filtering effect of the foreign substance is insufficient, and if it exceeds 30 seconds, the excessive packing pressure may increase the pyrolysis. It is also preferred that the L/D (length/diameter) of the extruder screw in the melt spinning process is from 10 to 40. If the L/D of the screw is less than 10, uniform melting is difficult. If the screw has an L/D of more than 40, the molecular weight may be lowered due to excessive shear stress.

The produced melt discharge yarn 4 is quenched and solidified by passing through the cooling zone 3. The quenching and solidifying process is classified into an open quenching method, a circular closed quenching method and a radial outflow quenching method according to a method of blowing cooling air in the cooling zone 3, and among these methods, the open quenching method is preferred. Thereafter, the discharged yarn 4 which has passed through the cooling zone 3 and solidified is oiled to 0.5 to 1.0% by the emulsion applying device 5 and becomes unstretched.

The preferred spinning speed of the prepared non-drawn yarn is 200 to 1,000 m/min. The yarn having passed through the first stretching roller 6 is made to pass through a series of stretching rollers 7, 8, 9 and 10 by a spin draw method, to thereby be stretched by the total stretching ratio of 4.0, preferably 4.5 to 6.5 to obtain the final drawn yarn 11.

It is advantageous that the value of the dry heat shrinkage (160° C., 30 minutes) of the produced fiber is 3 to 6%. The low shrinkage ratio of such fibers can be obtained by stabilizing the crystal structure of the drawn yarn in the heat treatment step performed after the two-stage stretching process. The multi-stage drawing process in the fiber manufacturing process includes a primary drawing process which proceeds at a high drawing magnification at a low drawing temperature and a secondary drawing process which proceeds at a relatively low drawing magnification at a high temperature. In the primary stretching operation, crystallization mainly proceeds by orientation. Crystallization by this orientation becomes a factor that determines the heat shrinkage of the cord. The preferred stretching temperature in the primary stretching step is 20 to 50° C. and the stretching ratio is 3.0 times or more. If an additional cooling device is not provided in the drawing roller in the process, it is difficult to control the drawing temperature to be less than 20° C., which is economically disadvantageous. On the other hand, if the drawing temperature exceeds 50° C., crystallization by heat may proceed. Further, if the stretching ratio is less than 3.0 times, sufficient orientation crystallization hardly occurs.

Through the second stretching process, crystallization proceeds by heat at a high temperature. At these high temperatures, heat-induced crystals affect the heat shrinkage of the cord. In the secondary drawing step of the present invention, the drawing temperature is preferably 200 to 250° C. and the drawing magnification is 2.0 times or less. When the drawing temperature is less than 200° C., sufficient crystallization does not proceed by heat. When the drawing temperature exceeds 250° C., a damage to the product is caused. Also, when the stretching ratio exceeds 2.0 times, the elongation of the yarn decreases sharply. The relaxation temperature is adjusted to 200 to 250° C. and the relaxation rate is adjusted to 3 to 7% in order to stabilize the crystal structure of the elongated yarn. The low shrinkage characteristics of such fibers can prevent rapid shrinking in the treatment process for a tire cord, and thus they are represented by a high strength utilization ratio.

Polyamide fibers prepared according to the process of the present invention have (1) a dry heat shrinkage rate of 3 to 6% (160° C., 30 minutes) (2) a strength of 9.0 g/d or more, (3) elongation of 10% or more, and (4) 500 to 3000 deniers.

Hereinafter, a method for producing the aramid yarn used in the present invention will be described in detail with reference to the accompanying drawings.

An apparatus for producing an aramid fiber includes: a dope supply unit; a spinneret; and a coagulation part, in which the coagulation part includes a coagulation bath located below the spinneret and containing a coagulating solution; a first coagulation tube positioned below the coagulation bath to provide a discharge passage for the coagulation liquid; an injection port attached to one side of the first coagulation tube at an angle of 20 to 40 degrees to inject a second coagulating solution; and a second coagulation tube attached to a lower end portion of the injection port, in which the second coagulation tube has a concavo-convex shape.

The dope containing the aromatic polyamide supplied from the dope supply portion is extruded through the spinneret and then solidified while passing through the solidifying portion to form the multifilament. The aromatic polyamide is a para-aramid having a high strength and a high elasticity, and may be a polyparaphenylene terephthalamide (PPD-T), a poly (4,4'-benzanilide terephthalamide), a poly (paraphenylene-4,4'-biphenylene-dicarboxylic acid amide), a poly (paraphenylene-2,6-naphthalene dicarboxylic acid amide), or a mixture of two or more thereof. The aromatic polyamide can be produced by the following method. First, an inorganic salt is added to an organic solvent to prepare a polymerization solvent. Examples of the organic solvent include N-methyl-2-pyrrolidone (NMP), N, N'-dimethylacetamide (DMAc), hexamethylphosphoramide (HMPA), N, N, N N'-tetramethylurea (TMU), N, N-dimethylformamide (DMF) and a mixture thereof. As the inorganic salt, $CaCl_2$, LiCl, NaCl, KCl, LiBr, KBr, or a mixture thereof may be used. The inorganic salt is added in order to increase the polymerization degree of the aromatic polyamide. However, when the inorganic salt is added in an excess amount, inorganic salts which are not dissolved in water may be present in the polymerization solvent. Therefore, the content of the inorganic salt in the polymerization solvent is preferably 10% by weight or less. Since the solubility of the inorganic salt in the organic solvent is poor, water is added to completely dissolve the inorganic salt, and then the water is removed through a dehydration process, whereby a final polymerization solvent can be prepared.

Next, the aromatic diamine is dissolved in the polymerization solvent to prepare a mixed solution. The aromatic diamine may be para-phenylenediamine, 4,4'-diaminobiphenyl, 2,6-naphthalenediamine, 1,5-naphthalenediamine, or 4,4'-diaminobenzanilide. Then, a primary polymerization is carried out by adding a predetermined amount of aromatic diacid halide to the mixed solution while stirring the mixed solution. The aromatic diacid halide may be terephthaloyl dichloride, 4,4'-benzoyl dichloride, 2,6-naphthalene dicarboxylic acid dichloride, or 1,5-naphthalene dicarboxylic acid dichloride. Through the primary polymerization, a prepolymer is formed in the polymerization solvent. Subsequently, an aromatic diacid halide is further added to the above polymerization solvent to carry out a secondary polymerization, and through this secondary polymerization, an aromatic polyamide is finally obtained. The aromatic polyamide may be polyparaphenylene terephthalamide (PPD-T), poly (4,4'-benzanilide terephthalamide), poly (paraphenylene-4,4'-biphenylene-dicarboxylic acid amide), or poly (paraphenylene-2,6-naphthalene dicarboxylic acid amide), depending on the type of aromatic diamine and aromatic diacid halide used.

Next, an alkaline compound such as NaOH, $Li_2CO_3$, $CaCO_3$, LiH, $CaH_2$, LiOH, $Ca(OH)_2$, $Li_2O$, CaO or the like is added to the polymerization solution to neutralize the hydrochloric acid generated during the polymerization reaction. On the other hand, it may be advantageous to carry out the subsequent processes by adding water to the polymerization solution obtained through the primary and secondary polymerization processes to prepare a slurry state to improve its flowability. At this time, the neutralization step and the slurry production step may be performed simultaneously by adding water in which the alkali compound is dissolved to the polymerization solution.

Subsequently, the polymerization solvent is extracted from the polymerization solution. Such an extraction process is most effective and economical to perform using water. For example, a filter may be installed in a bath equipped with an outlet, and the polymer may be placed on the filter, and then water may be poured to discharge the polymerization solvent contained in the polymer together with water to the outlet. On the other hand, if the particle size of the aromatic polyamide present in the polymerization solution is too large, it takes a long time to extract the polymerization solvent and the productivity may be lowered. Therefore, the step of pulverizing the aromatic polyamide may be performed before the polymerization solvent extraction step.

Then, the water remaining in the aromatic polyamide is removed through dehydration and drying processes. The dope prepared by the above method is supplied to the spinneret through the dope supplying unit and then extruded. The spinneret has a plurality of capillaries having a diameter of 0.1 mm or less. If the diameter of the capillary formed in the spinneret exceeds 0.1 mm, the molecular orientation of the resulting monofilament is deteriorated, resulting in a decrease in the strength of the multifilament. The concavo-convex shape is formed to promote the generation of turbulence, and the second coagulation tube has a cross-sectional diameter of 8 to 11 mm and a concavo-convex radius of 0.5 to 1.5 mm. The sum of the lengths of the first and second coagulation tubes is preferably 100 to 150 mm. If the sum of the lengths is less than 100 mm, the effect of irregularities is insufficient and uniform coagulation is not achieved. If the sum of the lengths exceeds 150 mm, the pumping ability of the coagulation solution stored in the coagulation bath can drop due to the resistance of the concavo-convex portion. The injection port is attached to one side of the first coagulation tube, preferably at an angle of 20 to 40°, preferably at an angle of 30°. If it is attached beyond the above-mentioned angle, that is, 20 to 40 degrees, the pumping ability to the coagulating solution becomes too slow, and high-speed spinning becomes impossible. The secondary coagulation solution injected through the injection port is manufactured so that the composition and temperature of the primary coagulation solution and the solvent are different. This is also intended to promote the generation of turbulence as in the case of the second coagulation tube of concavo-convex shape. The promotion of the generation of the turbulent flow can improve the extraction of the residual solvent, particularly sulfuric acid, and prevent the deterioration of the properties of the finally produced aramid fiber.

The properties of the aramid fiber may include elongation and tensile strength. However, the present invention is not limited thereto and includes all physical properties that can be measured by a person skilled in the art.

In the present invention, in the production of hybrid cords using nylon 6,6 or nylon 6 and aramid yarns, a step of giving a twist to the cord (a twisting process) is performed as a pre-stage of dip cord production.

In the twisting process of the present invention, in the nylon 6,6 or nylon 6 yarn and the aramid yarn manufactured by the above method, each wound yarn is twisted by a direct cabler which performs false twist and cabling at the same time, to thereby produce a raw cord for tire cords. The raw cord is manufactured by applying ply twist and then cable twist to nylon 6,6 or nylon 6 and aramid yarn for tire cord, and generally the same number of ply twists and cable twists are applied. In the twisting process, which is important in the present invention, aramid yarn is injected 5 to 100 mm/m longer than that of nylon 6,6 or nylon 6 yarn at the time of applying the ply twist for producing the raw cord.

The method for producing a hybrid dip cord excellent in fatigue resistance according to the present invention includes: the step of preparing one nylon 6,6 or nylon 6 yarn and one aramid yarn; the step of producing a ply twisted yarn by respectively applying 200 to 500 TPM twist by using the one aramid yarn longer than the nylon 6,6 or nylon 6 yarn; the step of producing a raw cord by applying 200 to 500 TPM twist by piling the ply twisted yarn as two yarns; and the step of producing a dip cord by dipping the raw cord in the dipping solution and heat-treating the raw cord.

Generally, when the twist is high, the strength decreases, and the elongation at specific load and the elongation at break tend to increase. The fatigue resistance also shows a tendency to improve with increasing twists. The soft tire cord manufactured according to the present invention was manufactured at 200 to 500 TPM (twist per meter) at the same time. At this time, when it is less than 200/200 TPM, the elongation at break of the cord is reduced and the fatigue resistance tends to be lowered. When it is higher than 500 TPM, the strength drop is large and is not suitable for tire cords.

The fineness of nylon 6,6 or nylon 6 yarn and aramid yarn used in twisting yarns is preferably 500 to 3000 denier. When the fineness is below 500 denier, the strength drop is very large at 500 TPM and when the fineness exceeds 3000 denier, the fatigue resistance drops 200 TPM, which is not preferred.

The hybrid cord according to the present invention is characterized in that the aramid yarn is inserted 5 to 100 mm/m longer than the nylon 6,6 or nylon 6 yarn when the yarn is untwisted. When it is less than 5 mm, the fatigue resistance drops which is not appropriate, and when exceeding 100 mm, the strength is decreased, which is not appropriate. It is more preferable that the aramid yarn is used 5 to 50 mm/m longer than the nylon 6,6 or nylon 6 yarn when the raw cord is untwisted, and it is most preferable that the aramid yarn is used 10 to 30 mm/m longer than the nylon 6,6 or nylon 6 yarn when the raw cord is untwisted.

High input of aramid yarn with high initial elongation and low elongation at break and low input of nylon 6,6 or nylon 6 yarn allow production of a raw cord in which the aramid yarn is used longer than nylon 6,6 or nylon 6 yarn.

In the manufacturing method according to the present invention, as the length of the aramid yarn is increased compared with the yarn of nylon 6,6 or nylon 6 yarn, the strength may be lowered and the elongation at specific load and the elongation at break may increase, thereby increasing the fatigue resistance. Especially in this case, the initial strain in the tensile test causes low modulus by nylon 6,6 or nylon 6, and high modulus is expressed from the section where aramid begins to receive the force. On the other hand, the smaller the amount of the aramid yarn used (longer than nylon 6,6, but shorter the length of the aramid yarn), the higher the strength and the lower the elongation at specific load and the elongation at break and the fatigue resistance become.

The manufactured raw cord is woven using a weaving machine, and the fabric obtained is immersed and cured in a dipping solution to produce a 'dip cord' for tire cords with a resin layer on the 'raw cord' surface.

The dipping process of the present invention is described below in more detail. Dipping is achieved by impregnating the surface of the fiber with a resin layer called RFL (Resorcinol Formalin-Latex), which is performed to improve the disadvantages of the tire cord fabric which is originally poor in adhesion to rubber.

Conventional rayon fibers or nylon fibers are usually subjected to one-bath dipping, and when polyethylene terephthalate or polyethylene naphthalate fibers are used, since the reactor on the fiber surface is less than the rayon fiber or the nylon fiber, the surface of polyethylene terephthalate or polyethylene naphthalate is first activated and then subjected to an adhesive treatment (2 bath dipping).

In the present invention, an adhesive liquid for bonding a hybrid cord and rubber can be manufactured by the following method. It is to be understood that the following examples are intended only for a better understanding of the present invention and are not intended to limit the scope of the present invention.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring.

Next, 300 parts by weight of 40 wt % VP-latex, 129 parts by weight of distilled water and 23.8 parts by weight of 28% ammonia water were added and aged at 25° C. for 20 hours to maintain a solid concentration of 19.05%.

A stretch of 0 to 3% is required to adjust the adhesion amount of the adhesive liquid, and preferably 1 to 2% of the elongation can be achieved. If the elongation percentage is too high, the adhesion amount of the adhesive liquid can be adjusted but the yield is reduced and the fatigue resistance is reduced as a result. On the other hand, if the elongation percentage is too low, for example, if it is lowered to less than 0%, there is a problem that it is impossible to control the DPU as the dipping solution permeates into the dip cord.

The adhesion amount of the adhesive is preferably 2 to 7% based on the weight of the fibers on a solid basis. After passing through the adhesive solution, the hybrid dip cords are dried at 120-180° C. The hybrid dip cords are dried for 180 seconds to 220 seconds, and preferably dried in a state where the hybrid dip cord is stretched to about 1 to 2% in the drying process. If the elongation ratio is low, elongation at specific load and the elongation at break of the cords may increase to thereby show properties which is difficult to be applied as the tire cord. On the other hand, if the elongation ratio is more than 3%, the level of the elongation at specific load is adequate but the elongation at break may be too small to thereby decrease the fatigue resistance.

After drying, heat treatment is performed at a temperature range of 130 to 260° C. The elongation ratio during the heat treatment is maintained between −2 and 3%, and the heat treatment time is suitably between 50 and 90 seconds. If the heat treatment is performed for less than 50 seconds, the reaction time of the adhesive solution is insufficient and the adhesive force is lowered. If the heat treatment is performed for more than 90 seconds, the hardness of the adhesive solution becomes high and the fatigue resistance of the cord may be decreased.

The hybrid dip cord produced according to the above-described method is characterized by having a fatigue resistance of 80% or more. When the fatigue resistance is less than 80%, the durability of the tire is reduced, which is not preferable.

The hybrid dip cord manufactured through such a process is used for the manufacture of tires for passenger cars. When working with a bladder to inflate a green tire inside a mold during vulcanization, it is easily deformed compared to when the aramid yarn is used alone, so that it is used for easy manufacture of a tire. The hybrid dip cord manufactured through such a process is applied to tires for passenger cars. It is mainly applied to cap ply and carcass ply and improves low fatigue resistance and adhesion which are problematic when using aramid yarn alone, and improves the low modulus and heat resistance which is problematic when nylon 6,6 or nylon 6 is used alone, to thereby manufacture a high performance tire having excellent fatigue resistance.

In order to produce the hybrid dip cord according to the present invention, one nylon 6,6 or nylon 6 yarn and one aramid yarn are pre-twisted respectively and are then cabled to generate a raw cord, then the raw cord is dipped in a dipping solution and is then heat-treated to cause a heat shrinkage so that the length of the nylon 6,6 or the nylon 6 yarn becomes shorter than that of the aramid yarn. And when the thus prepared dip cords were untwisted, the aramid yarn becomes 5 to 100 mm/m longer compared to nylon 6,6 or nylon 6 yarn.

In the production of hybrid cords using nylon 6,6 or nylon 6 and aramid yarns which have been manufactured, a step of giving a twist to the cord (a twisting process) is performed as a pre-stage of dip cord production.

In the twisting process of the present invention, in the nylon 6,6 or nylon 6 yarn and the aramid yarn manufactured by the above method, each wound yarn is twisted by a direct cabler which performs false twist and cabling at the same time, to thereby produce a raw cord for tire cords. The raw cord is manufactured by applying ply twist and then cable twist to nylon 6,6 or nylon 6 and aramid yarn for tire cord, and generally the same number of ply twists and cable twists are applied.

Generally, when the twist is high, the strength decreases, and the elongation at specific load and the elongation at break tend to increase. The fatigue resistance also shows a tendency to improve with increasing twists. The soft tire cord manufactured according to the present invention was manufactured at 200 to 500 TPM (twist per meter) at the same time. At this time, when it is less than 200/200 TPM, the elongation at break of the cord is reduced and the fatigue resistance tends to be lowered. When it is higher than 500 TPM, the strength drop is large and is not suitable for tire cords.

The fineness of nylon 6,6 or nylon 6 yarn and aramid yarn used in twisting yarns is preferably 500 to 3000 denier. When the fineness is below 500 denier, the strength drop is very large at 500 TPM and when the fineness exceeds 3000 denier, the fatigue resistance drops 200 TPM, which is not preferred.

The manufactured raw cord is woven using a weaving machine, and the fabric obtained is immersed and cured in a dipping solution to produce a 'dip cord' for tire cords with a resin layer on the 'raw cord' surface.

The dipping process of the present invention is described below in more detail. Dipping is achieved by impregnating the surface of the fiber with a resin layer called RFL (Resorcinol Formalin-Latex), which is performed to improve the disadvantages of the tire cord fabric which is originally poor in adhesion to rubber.

Conventional rayon fibers or nylon fibers are usually subjected to one-bath dipping, and when polyethylene terephthalate or polyethylene naphthalate fibers are used, since the reactor on the fiber surface is less than the rayon fiber or the nylon fiber, the surface of polyethylene terephthalate is first activated and then subjected to an adhesive treatment (2 bath dipping).

In the present invention, an adhesive liquid for bonding a hybrid cord and rubber can be manufactured by the following method. It is to be understood that the following examples are intended only for a better understanding of the present invention and are not intended to limit the scope of the present invention.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring. Next, 300 parts by weight of 40 wt % VP-latex, 129 parts by weight of distilled water and 23.8 parts by weight of 28% ammonia water were added and aged at 25° C. for 20 hours to maintain a solid concentration of 19.05%.

A stretch of 0 to 3% is required to adjust the adhesion amount of the adhesive liquid, and preferably 1 to 2% of the elongation can be achieved. If the elongation percentage is too high, the adhesion amount of the adhesive liquid can be adjusted but the yield is reduced and the fatigue resistance is reduced as a result. On the other hand, if the elongation percentage is too low, for example, if it is lowered to less than 0%, there is a problem that it is impossible to control the DPU as the dipping solution permeates into the dip cord.

The adhesion amount of the adhesive is preferably 2 to 7% based on the weight of the fibers on a solid basis. After passing through the adhesive solution, the hybrid dip cords are dried at 120-180° C. The hybrid dip cords are dried for 180 seconds to 220 seconds, and preferably dried in a state where the hybrid dip cord is stretched to about 1 to 2% in the drying process. If the elongation ratio is low, elongation at specific load and the elongation at break of the cords may increase to thereby show properties which is difficult to be applied as the tire cord. On the other hand, if the elongation ratio is more than 3%, the level of the elongation at specific load is adequate but the elongation at break may be too small to thereby decrease the fatigue resistance.

After drying, heat treatment is performed at a temperature range of 130 to 260° C. The elongation ratio during the heat treatment is maintained between −2 and 3%, and the heat treatment time is suitably between 50 and 90 seconds. If the heat treatment is performed for less than 50 seconds, the reaction time of the adhesive solution is insufficient and the adhesive force is lowered. If the heat treatment is performed for more than 90 seconds, the hardness of the adhesive solution becomes high and the fatigue resistance of the cord may be decreased.

Herein, the shrinking of the nylon 6,6 or nylon 6 yarns in the heat treatment step uses one selected from the group consisting of a method of controlling the tension applied to the raw cord, a method of adjusting the heat treatment temperature, and a method of controlling the heat treatment time.

The tension was controlled through the speed of the feed roller and the winding roller, the heat treatment temperature was 130 to 240° C., and the heat treatment time was 50 to 90 seconds.

With respect to this heat treatment process, a raw cord is produced while the numbers of twists of aramid yarn and nylon 6,6 or nylon 6 yarn in the twisting step remain the same, and then when the raw cord is heat-treated, nylon 6,6 or nylon 6 shrinks, and when the dip cord is untwisted, the length of aramid yarn per unit length becomes longer than that of nylon 6,6 or nylon 6 yarns per unit length. As nylon 6,6 or nylon 6 shrinks and the length of the aramid yarn becomes longer than nylon 6,6 or nylon 6, the initial deformation in the tensile test is caused by nylon 6,6 or nylon 6 and the subsequent deformation is caused by the aramid yarn.

The length difference caused by shrinkage of the nylon 6,6 or nylon 6 yarn is effective when the length difference of each yarn is about 5 to 100 mm/m when the dip cord is loosened, and it is effective that the aramid yarn is preferably long. If the difference is less than 5 mm, the fatigue resistance is reduced, which is not appropriate. If the difference exceeds 100 mm, the strength is decreased, which is not appropriate. According to one embodiment of the present invention, it is most preferable that the difference is 10 to 30 mm/m.

In the manufacturing method according to the present invention, the longer the aramid yarn is compared to nylon 6,6 or nylon yarn 6, the lower the tenacity becomes and greater the elongation at specific load and the elongation at break becomes, and the fatigue resistance also increases. In contrast, the shorter the length of the aramid yarn becomes (longer than nylon 6,6 or nylon 6, but shorter the length of the aramid yarn becomes), the higher the strength becomes and lower the elongation at specific load/the elongation at break and the fatigue resistance becomes. Especially in this case, the initial strain in the tensile test causes low modulus by nylon 6,6 or nylon 6, and high modulus is expressed from the section where aramid begins to receive the force.

The hybrid dip cord produced according to the above-described method is characterized by having a fatigue resistance of 85% or more. When the fatigue resistance is less than 80%, the durability of the tire is reduced, which is not preferable.

The hybrid dip cord manufactured through such a process is used for the manufacture of tires for passenger cars. When working with a bladder to inflate a green tire inside a mold during vulcanization, it is easily deformed compared to when the aramid yarn is used alone, so that it is used for easy manufacture of a tire. The hybrid dip cord manufactured through such a process is applied to tires for passenger cars. It is mainly applied to cap ply and carcass ply and improves low fatigue resistance and adhesion which are problematic when using aramid yarn alone, and improves the low modulus and heat resistance which is problematic when nylon 6,6 or nylon 6 is used alone, to thereby manufacture a high performance tire having excellent fatigue resistance.

Another important spinning process of the present invention is to supply polyethylene terephthalate yarn longer than the aramid yarn using heat shrinkage of nylon 6,6 yarn or nylon 6 yarn during heat treatment at the time of applying the ply twist for the production of raw cord.

Generally, when the twist is high, the strength decreases, and the elongation at specific load and the elongation at break tend to increase. The fatigue resistance also shows a tendency to improve with increasing twists. The soft tire cord manufactured according to the present invention was manufactured at 200 to 500 TPM (twist per meter) at the same time. At this time, when it is less than 200/200 TPM, the elongation at break of the cord is reduced and the fatigue resistance tends to be lowered. When it is higher than 500 TPM, the strength drop is large and is not suitable for tire cords.

The fineness of nylon 6,6 or nylon 6 yarn and aramid yarn used in twisting yarns is preferably 500 to 3000 denier. When the fineness is below 500 denier, the strength drop is very large at 500 TPM and when the fineness exceeds 3000 denier, the fatigue resistance drops 200 TPM, which is not preferred.

A method of manufacturing a hybrid dip cord according to the present invention includes: a step of preparing one nylon 6,6 yarn or nylon 6 yarn and one aramid yarn; a step of producing a primarily twisted yarn by applying a twist of 200 to 500 TPM by inputting one nylon 6,6 or nylon 6 yarn longer than the aramid yarn; a set of cabling the primarily twisted yarn as two to apply a twist of 200 to 500 TPM to thereby produce a raw cord; and a step of dipping the raw cord in an adhesive liquid and heat-treat the raw cord, in which in the step of producing the primarily twisted yarn, one nylon 6,6 or nylon 6 yarn is input 5 to 100 mm/m longer than one aramid yarn, and the nylon 6,6 or nylon 6 is heat-shrunk so that the length of the nylon 6,6 or the nylon 6 becomes equal to the length of the aramid yarn.

The present invention is characterized in that in the step of producing a primarily twisted yarn by applying a twist to one yarn of nylon 6,6 yarn or nylon yarn 6 and one yarn of aramid yarn, one nylon 6,6 or nylon 6 yarn is input 5 to 100 mm/m longer than one aramid yarn, which are then cabled so as then to adjust the tensile strength or the temperature so that the nylon 6,6 yarn or the nylon 6 yarn is thermally shrunk to the same length as the aramid yarn during the heat treatment.

That is, nylon 6,6 yarn or nylon 6 yarn having a high shrinkage ratio is 3 to 6% heat shrinkable by heat treatment, but the aramid yarn having a low shrinkage ratio hardly undergo thermal shrinkage even after heat treatment. As such, in consideration of the difference between the degree of heat shrinkage of nylon 6,6 or nylon 6 and the degree of heat shrinkage of aramid yarn, when producing a raw cord, nylon 6,6 yarn or nylon 6 yarn is input longer than aramid yarn to produce a raw cord. Further, when the raw cord is heat-treated, by allowing nylon 6,6 or nylon 6 high in elongation to be equal in length to aramid yarn of high modulus, by which the nylon 6,6 yarn or the nylon 6 yarn and the aramid yarn can have the same breaking timing, thereby exhibiting excellent strength and initial modulus of the hybrid dip cord.

In the step of producing a primarily twisted yarn, if nylon 6,6 or nylon 6 yarn is not input longer, the nylon 6,6 or nylon 6 yarn is thermally shrunk to be shorter than the aramid yarn during the heat treatment, and at the initial elongation of the raw cord, nylon 6,6 or nylon 6 with low modulus may be first subjected to the force, which causes the cord strength to decrease.

Methods for heat shrinking nylon 6,6 or nylon 6 yarns include tension-controlled and temperature-controlled methods. The tension adjustment is performed by a speed difference between the feed roller and the take-up roller, but is not limited thereto. The temperature control method can be adjusted at 130 to 240° C. Both methods involve adjusting the heat treatment time, which can be adjusted in 50 seconds to 5 minutes. Depending on the heat treatment conditions, the degree of shrinkage of nylon 6,6 or nylon 6 may vary.

The extent to which nylon 6,6 or nylon 6 is applied longer than aramid yarn is related to the degree of heat shrinkage. Preferably 5 to 100 mm/m and more preferably 7 to 50 mm/m are applied. When the amount is less than 5 mm/m, the fatigue resistance is decreased, which is not preferable as a tire cord. When more than 100 mm/m is used, the strength is not ensured, so it is not appropriate as the tire cord. According to one embodiment of the present invention, it is most preferable to further add 10 to 30 mm/m.

The manufactured raw cord is woven using a weaving machine, and the fabric obtained is immersed and cured in a dipping solution to produce a 'dip cord' for tire cords with a resin layer on the 'raw cord' surface.

The dipping process of the present invention is described below in more detail. Dipping is achieved by impregnating the surface of the fiber with a resin layer called RFL (Resorcinol Formalin-Latex), which is performed to improve the disadvantages of the tire cord fabric which is originally poor in adhesion to rubber.

Conventional rayon fibers or nylon fibers are usually subjected to one-bath dipping, and when polyethylene terephthalate or polyethylene naphthalate fibers are used, since the reactor on the fiber surface is less than the rayon fiber or the nylon fiber, the surface of polyethylene terephthalate is first activated and then subjected to an adhesive treatment (2 bath dipping).

In the present invention, an adhesive liquid for bonding a hybrid cord and rubber can be manufactured by the following method. It is to be understood that the following examples are intended only for a better understanding of the present invention and are not intended to limit the scope of the present invention.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring. Next, 300 parts by weight of 40 wt % VP-latex, 129 parts by weight of distilled water and 23.8 parts by weight of 28% ammonia water were added and aged at 25° C. for 20 hours to maintain a solid concentration of 19.05%.

A stretch of 0 to 3% is required to adjust the adhesion amount of the adhesive liquid, and preferably 1 to 2% of the elongation can be achieved. If the elongation percentage is too high, the adhesion amount of the adhesive liquid can be adjusted but the yield is reduced and the fatigue resistance is reduced as a result. On the other hand, if the elongation percentage is too low, for example, if it is lowered to less than 0%, there is a problem that it is impossible to control the DPU as the dipping solution permeates into the dip cord.

The adhesion amount of the adhesive is preferably 2 to 7% based on the weight of the fibers on a solid basis. After passing through the adhesive solution, the hybrid dip cords are dried at 120-180° C. The hybrid dip cords are dried for 180 seconds to 220 seconds, and preferably dried in a state where the hybrid dip cord is stretched to about 1 to 2% in the drying process. If the elongation ratio is low, elongation at specific load and the elongation at break of the cords may increase to thereby show properties which is difficult to be applied as the tire cord. On the other hand, if the elongation ratio is more than 3%, the level of the elongation at specific load is adequate but the elongation at break may be too small to thereby decrease the fatigue resistance.

After drying, heat treatment is performed at a temperature range of 130 to 260° C. The elongation ratio during the heat treatment is maintained between −2 and 3%, and the heat treatment time is suitably between 50 and 90 seconds. If the heat treatment is performed for less than 50 seconds, the reaction time of the adhesive solution is insufficient and the adhesive force is lowered. If the heat treatment is performed for more than 90 seconds, the hardness of the adhesive solution becomes high and the fatigue resistance of the cord may be decreased.

Particularly, in the present invention, nylon 6,6 yarn or nylon 6 yarn is used longer than aramid yarn in the raw cord step, but in the heat treatment step, the nylon 6,6 yarn or the nylon 6 yarn is thermally shrunk by adjusting the tension or controlling the temperature so as to make the yarn length equal to the length of the aramid yarn.

The present invention mainly describes the case of performing dipping using a 2-bath dipping device, but it is also possible to perform heat treatment under the same conditions using a 1-bath dipping device as long as the person is skilled in the related art.

The hybrid dip cord prepared according to the method described above is characterized by having a strength of 40 kg or more and an elongation at specific load of 3.8% or less. When the strength is less than 40 kg, the stability of handling is reduced when manufactured as the tire, and when the elongation at specific load is more than 3.8%, the noise is increased when manufactured as the tire.

The hybrid dip cord produced through such a process is applied as a carcass ply and a cap ply and is used for manufacturing tires for passenger cars.

Figure 3:
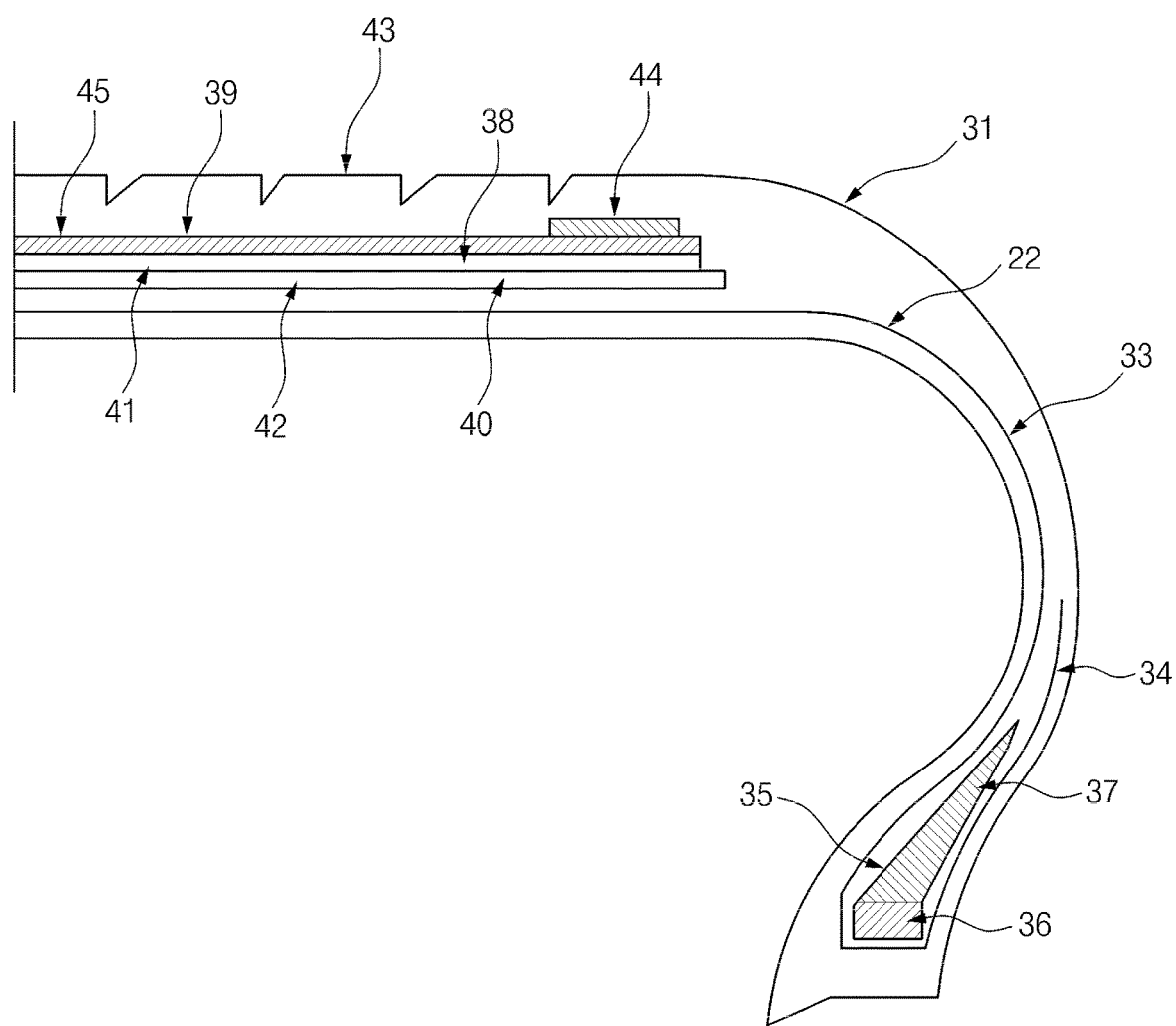
FIG. 3 schematically shows a structure of a tire for a passenger car produced by using a hybrid dip cord in a carcass layer or a cap ply layer according to the present invention.

FIG. 3 shows the structure of a tire for a passenger car in which the hybrid dip cord according to the present invention is applied as a carcass ply or a cap ply.

Referring to FIG. 3, the bead region 35 of the tire 31 becomes an annular bead core 36 that is non-stretchable. The bead core 36 is preferably made of a single or single filament steel wire wound continuously. In a preferred embodiment, a high strength steel wire having a diameter of 0.95 mm to 1.00 mm forms a 4×4 structure and a 4×5 structure.

In an embodiment of the tire cord according to the present invention the bead region 35 may have a bead filler 37 and the bead filler 37 should have a hardness above a certain level and preferably a Shore A hardness 40 or more.

According to the present invention, the tire 31 can be reinforced by the belt 38 and the cap ply 39. The belt 38 includes a cut belt ply 40 consisting of two cords 41 and 42 and the cord 41 of the belt ply 40 may be oriented at an angle of about 20 degrees with respect to the circumferential center plane of the tire. One cord 41 of the belt ply 40 may be disposed opposite the direction of the cord 42 of the other belt ply 40 in a direction opposite the circumferential center plane. However, the belt 38 may include any number of plys, and may preferably be arranged in the range of 16 to 24°. The belt 38 serves to provide lateral stiffness to minimize the rise of the tread 33 from the road surface during operation of the tire 31. The cords 41 and 42 of the belt 38 may be made of steel cords and have a 2+2 structure, but may be made of any structure. The cap ply 39 and the edge ply 44 are reinforced at the top of the belt 38. The cords 45 of the cap ply 39 are reinforced in parallel with the circumferential direction of the tire so as to suppress the size change in the circumferential direction due to the high-speed rotation of the tire, and the cords 45 of the cap ply 39 having a large heat-shrinking stress at a high temperature are used. The cord 45 of the cap ply 39 may be manufactured using hybrid dip cords made of lyocell yarns and para-aramid yarns.

One layer of cap ply 39 and one layer of edge ply 44 may be used, and preferably one or two layers of cap ply and one or two layers of edge ply may be reinforced.

Reference numerals 32 and 34 of FIG. 3 denote a carcass layer 32 and a ply turn-up 34. And reference numeral 33 denotes a carcass layer reinforcing cord 33.

Embodiments and comparative examples which do not limit the scope of the present invention are described below. In the following Examples and Comparative Examples, the properties of the hybrid dip cords were evaluated by the following methods.

(a) Hybrid dip cord strength (kgf) and moderate elongation (%)

The dip cord was dried at 107° C. for 2 hours and was then measured at a sample length of 250 mm and a tensile speed of 300 m/min using a low-speed stretching type tensile tester manufactured by Instron. The elongation at specific load was measured at a load of 4.5 kg.

(b) Shrinkage (%)

After leaving at it is at 25° C. and 65% RH for 24 hours, the shrinkage ratio was expressed by using the ratio of the length (L0) measured at a static load of 0.05 g/d and the length (L1) after treatment at a static load of 0.05 g/d at 150° C. for 30 minutes.

S(%)=(L0−L1)/L0×100

(c) hybrid dip cord E-S value

The elongation under a specific load" is referred to as "elongation at specific load (E)" in the present invention. "S" means a shrinkage rate in the above (b), and the sum of the elongation at specific load and the shrinkage rate is indicated by "E-S".

E-S=moderate elongation (%)+dry heat shrinkage (%)

(d) Fatigue Resistance

After fatigue is tested using Belt Fatigue Tester which is commonly used for fatigue test of tire cords, residual strength was measured to compare fatigue resistance. The fatigue test conditions were normal temperature, load of 80 kg, and 37,500 times of repetition. After the fatigue test, the rubber and the cord were separated and the residual strength was measured. The residual strength was measured according to the above method (a) using a normal tensile strength tester.

EXAMPLE 1

Nylon 6,6 and aramid fibers were obtained in the same manner as described above to produce tire reinforcing fibers. One twisted nylon 6,6 yarn (1260D) and one twisted aramid yarn (1500D) were twisted at 300 TPM, respectively, and they were twisted to give a twist of 300 TPM, to thereby prepare a raw cord. At this time, aramid yarn was used 10 mm/m longer than nylon 6,6 yarn. And then the raw cord passed through an adhesive liquid prepared by the following method to apply the adhesive liquid. A 2% stretch was applied during drying to prevent unevenness of the raw cord due to heat shrinkage.

After preparing a solution containing 29.4 wt % resorcinol 45.6 parts by weight; 255.5 parts by weight of distilled water; 37% formalin 20 parts by weight; and 3.8 parts by weight of 10 wt % sodium hydroxide, the prepared solution is reacted with stirring at 25° C. for 5 hours, and then the following elements were added: 300 parts by weight of 40 wt % VP-latex, 129 parts by weight of distilled water, and 28% ammonia water 23.8 parts by weight. After the elements were added, the mixture was aged at 25° C. for 20 hours to maintain the solid concentration at 19.05%. The adhesive liquid was applied and dried at 150° C. for 2 minutes and then subjected to heat treatment at 170° C. for 60 seconds to evaluate the physical properties of the prepared hybrid dip cords, and the result is shown in Table 1.

EXAMPLE 2

A hybrid dip cord was prepared in the same manner as in Example 1 except that the fineness of the aramid yarn was 1000 denier and the fineness of the nylon 6,6 yarn was 840 denier. The properties of the thus-prepared dip cords were evaluated and are shown in Table 1.

EXAMPLE 3

A hybrid dip cord was prepared in the same manner as in Example 1 except that the length of the aramid yarn was longer by 20 mm/m than that of the nylon 6,6 yarn at the time of applying Z-twist at the twisting stage in the production of the raw cord, and the properties of the cord were evaluated and are shown in Table 1.

EXAMPLE 4

A hybrid dip cord was prepared in the same manner as in Example 1 except that the length of the aramid yarn was longer by 30 mm/m than that of the nylon 6,6 yarn at the time of applying Z-twist at the twisting stage in the production of the raw cord, and the properties of the cord were evaluated and are shown in Table 1.

EXAMPLE 5

A hybrid dip cord was prepared in the same manner as in Example 1 except that the length of the aramid yarn was longer by 30 mm/m than that of the nylon 6,6 yarn at the time of applying Z-twist at the twisting stage in the production of the raw cord, to thereby prepare a raw cord and a process cord. The properties of the thus-prepared dip cords were evaluated and are shown in Table 1.

COMPARATIVE EXAMPLE 1

During the twisting process for the production of raw cord, a hybrid dip cord was prepared in the same manner as in Example except that after applying a pre-twist of 40 TPM to one aramid (1500D), a twist of 300 TPM was applied to the one pre-twisted aramid yarn (1500D) and one non-twisted nylon yarn 660 yarn (1260D) to thereby produce a primarily twisted yarn, and then the primarily twisted yarn was cabled while inputting the same length of the aramid yarn and the nylon 6,6. The properties of the thus-prepared dip cords were evaluated and are shown in Table 1.

COMPARATIVE EXAMPLE 2

During the twisting process for the production of raw cord, the hybrid dip cords were manufactured in the same manner as in Example 1 except that one twisted nylon 6,6 yarn (1260D) and one aramid yarn (1500D) were twisted at 300 TPM, respectively, to produce a ply twist yarn, and the aramid yarns and the nylon 6,6 yarns were inserted in the same length. The properties of the thus-prepared dip cords were evaluated and are shown in Table 1.

were aligned at an angle of 90 degrees with respect to the circumferential intermediate surface of the tire. The ply turn-up 34 has a height of 40 to 80% with respect to the maximum cross-sectional height of the tire. The bead portion 35 has a bead core 36 having 4 high strength steel wires having a diameter of 0.95 to 1.00 mm and a bead filler 37 having a shore A hardness of 40 or more. The belt 38 is reinforced by a belt reinforcing layer consisting of one layer of cap ply 39 and one layer of edge ply 44 at the top so that the cap ply cords in the cap ply 39 are parallel to the circumferential direction of the tire.

EXAMPLE 7

A tire was prepared in the same manner as in Example 6, except that the hybrid dip cord prepared in Example 2 was used as a cord material for tire production.

EXAMPLE 8

A tire was prepared in the same manner as in Example 6, except that the hybrid dip cord prepared in Example 3 was used as a cord material for tire production.

EXAMPLE 9

A tire was prepared in the same manner as in Example 6, except that the hybrid dip cord prepared in Example 4 was used as a cord material for tire production.

EXAMPLE 10

A tire was prepared in the same manner as in Example 6, except that the hybrid dip cord prepared in Example 5 was used as a cord material for tire production.

TABLE 1

| | Process cord properties | | | | |
|---|---|---|---|---|---|
| | strength (kg) | elongation at 6.8 kg (%) | shrinkage (%) | ES (%) | Fatigue resistance (%) | Remarks |
| Example 1 | 37.2 | 5.0 | 1.7 | 6.7 | 85.4 | |
| Example 2 | 24.7 | 5.1 | 1.4 | 6.5 | 87.8 | |
| Example 3 | 36.8 | 5.3 | 1.8 | 7.1 | 88.8 | |
| Example 4 | 36.6 | 5.6 | 1.9 | 7.5 | 88.7 | |
| Example 5 | 36.3 | 5.9 | 2.0 | 7.9 | 89.9 | |
| Comparative Example 1 | 36.5 | 5.2 | 2.0 | 5.1 | 75.1 | Fatigue resistance is low |
| Comparative Example 2 | 38.6 | 4.7 | 1.8 | 6.5 | 71.2 | Fatigue resistance is low |

From the results of the tests in Table 1, it can be seen that the fatigue resistance of the hybrid dip cord according to the present invention is improved as compared with the comparative example.

EXAMPLE 6

A radial tire manufactured using the hybrid dip cord manufactured by Example 1 of the present invention as a cap ply has a carcass layer having a radially outer side ply turn-up, and the carcass layer is provided so as to include one layer. At this time, the specifications of the carcass cords were as shown in the following Table 2 and the carcass cords

COMPARATIVE EXAMPLE 3

A tire was prepared in the same manner as in Example 6, except that the dip cord prepared in Comparative Example 1 was used as a cord material for tire production.

COMPARATIVE EXAMPLE 4

A tire was prepared in the same manner as in Example 6, except that the dip cord prepared in Comparative Example 2 was used as a cord material for tire production.

TABLE 2

|  |  | Example 6 | Example 7 | Example 8 | Example 9 | Example 10 | Comparative Example 3 | Comparative Example 4 |
|---|---|---|---|---|---|---|---|---|
| Carcass | material | Polyethylene terephthalate | Polyethylene terephthalate | Polyethylene terephthalate | Polyethylene terephthalate | Polyethylene terephthalate | Polyethylene terephthalate | Polyethylene terephthalate |
|  | standard (d/twisted yarn) | 1500d/2 | 1500d/2 | 1500d/2 | 1500d/2 | 1500d/2 | 1500d/2 | 1500d/2 |
|  | Strength (Kg) | 24 | 24 | 24 | 24 | 24 | 24 | 24 |
|  | Modulus of elasticity (g/d) | 60 | 60 | 60 | 60 | 60 | 60 | 60 |
| Cap ply | material | Hybrid dip cord of Example 1 | Hybrid dip cord of Example 2 | Hybrid dip cord of Example 3 | Hybrid dip cord of Example 4 | Hybrid dip cord of Example 5 | Hybrid dip cord of Comparative Example 1 | Hybrid dip cord of Comparative Example 2 |
| Tire | Flatness ratio | 0.60 | 0.60 | 0.60 | 0.60 | 0.60 | 0.60 | 0.60 |
|  | Number of carcass layer | 1 | 1 | 1 | 1 | 1 | 1 | 1 |
|  | Number of cap ply layer | 1 | 1 | 1 | 1 | 1 | 1 | 1 |

EXAMPLE 11

A radial tire manufactured using the hybrid dip cord manufactured by Example 1 of the present invention in the carcass layer has a carcass layer having a radially outer side ply turn-up, and the carcass layer is provided so as to include one layer. The specifications of the cap ply and carcass cord were as shown in Table 3 below, and tires were produced in the same manner as in Example 6.

EXAMPLE 12

A tire was prepared in the same manner as in Example 6, except that the hybrid dip cord prepared in Example 2 was used as a cord material for tire production.

EXAMPLE 13

A tire was prepared in the same manner as in Example 6, except that the hybrid dip cord prepared in Example 3 was used as a cord material for tire production.

EXAMPLE 14

A tire was prepared in the same manner as in Example 6, except that the hybrid dip cord prepared in Example 4 was used as a cord material for tire production.

EXAMPLE 15

A tire was prepared in the same manner as in Example 6, except that the hybrid dip cord prepared in Example 5 was used as a cord material for tire production.

COMPARATIVE EXAMPLE 5

A tire was prepared in the same manner as in Example 6, except that the dip cord prepared in Comparative Example 1 was used as a cord material for tire production.

COMPARATIVE EXAMPLE 6

A tire was prepared in the same manner as in Example 6, except that the dip cord prepared in Comparative Example 2 was used as a cord material for tire production.

TABLE 3

|  |  | Example 11 | Example 12 | Example 13 | Example 14 | Example 15 | Comparative Example 5 | Comparative Example 6 |
|---|---|---|---|---|---|---|---|---|
| Carcass | Material | Hybrid dip cord of Example 1 | Hybrid dip cord of Example 2 | Hybrid dip cord of Example 3 | Hybrid dip cord of Example 4 | Hybrid dip cord of Example 5 | Hybrid dip cord of Comparative Example 1 | Hybrid dip cord of Comparative Example 2 |
| Cap ply | Metarial | Nylon 6, 6 | Nylon 6, 6 | Nylon 6, 6 | Nylon 6, 6 | Nylon 6, 6 | Nylon 6, 6 | Nylon 6, 6 |
|  | standard (d/twisted yarn) | 1260d/2 | 1260d/2 | 1260d/2 | 1260d/2 | 1260d/2 | 1260d/2 | 1260d/2 |
|  | strength (kg) | 24 | 24 | 24 | 24 | 24 | 24 | 24 |

TABLE 3-continued

|  |  | Example 11 | Example 12 | Example 13 | Example 14 | Example 15 | Comparative Example 5 | Comparative Example 6 |
|---|---|---|---|---|---|---|---|---|
|  | Modulus of elasticity (g/d) | 50 | 50 | 50 | 50 | 50 | 50 | 50 |
| Tire | Flatness ratio | 0.60 | 0.60 | 0.60 | 0.60 | 0.60 | 0.60 | 0.60 |
|  | Number of carcass layer | 1 | 1 | 1 | 1 | 1 | 1 | 1 |
|  | Number of cap ply layer | 1 | 1 | 1 | 1 | 1 | 1 | 1 |

The 205/65 R15 V tire manufactured according to Examples 6, 7, 8, 9, 10, 11, 12, 13, 14 and 15 and Comparative Examples 3, 4, 5 and 6 was mounted on a 2000 cc class passenger car, and the noise generated in the vehicle while driving at 60 km/h was measured and the noise in the audio frequency range was expressed in dB. Further, the steering stability and riding comfortability were evaluated by the test course driving of trained drivers in 5 point units among 100 points. And the result was shown in Table 4 below. The durability was measured according to the P-metric tire endurance test method of FMVSS 109 at a temperature of 38° C., the tire load of 85, 90 and 100%, and a vehicle was driven for a total of 34 hours at the speed of 80 km/h. And it was judged as OK (OK) when no traces such as bead separation, cord cutting, belt separation, etc. were found in any part such as a tread, a sidewall, a carcass cord, an inner liner and a bead.

TABLE 4

| Division | Weight of tire (kg) | riding comfortability | steering stability | durability | uniformity | noise (dB) |
|---|---|---|---|---|---|---|
| Example 6 | 9.98 | 100 | 100 | OK | 100 | 60.4 |
| Example 7 | 9.98 | 100 | 100 | OK | 100 | 60.4 |
| Example 8 | 9.99 | 100 | 100 | OK | 100 | 60.5 |
| Example 9 | 10.02 | 100 | 100 | OK | 100 | 61.2 |
| Example 10 | 10.1 | 100 | 100 | OK | 100 | 61 |
| Comparative Example 3 | 10.01 | 97 | 96 | OK | 92 | 62 |
| Comparative Example 4 | 10.08 | 94 | 95 | OK | 93 | 62.1 |
| Example 11 | 10.2 | 100 | 100 | OK | 100 | 60.4 |
| Example 12 | 10.2 | 100 | 100 | OK | 100 | 60.3 |
| Example 13 | 10.12 | 100 | 100 | OK | 100 | 60.4 |
| Example 14 | 10.0 | 100 | 100 | OK | 100 | 60.6 |
| Example 15 | 10.21 | 100 | 100 | OK | 100 | 60.6 |
| Comparative Example 5 | 10.5 | 95 | 97 | OK | 94 | 61.5 |
| Comparative Example 6 | 10.6 | 95 | 94 | OK | 93 | 63 |

Referring to the test results of Table 4, the tires using the hybrid cord (Examples 6 to 15) according to the present invention were more effective in noise reduction and steering stability than Comparative Examples 3 to 6, and the uniformity of tires has also been improved.

EXAMPLE 16

Nylon 6,6 and aramid fibers were obtained in the same manner as described above to produce tire reinforcing fibers. One twisted nylon 6,6 yarn (1260D) and one twisted aramid yarn (1500D) were twisted at 400 TPM, respectively, and they were twisted to give a twist of 400 TPM, to thereby prepare a raw cord. And then the raw cord passed through an adhesive liquid prepared by the following method to apply the adhesive liquid.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring, followed by adding the following elements:

300 parts by weight of 40 wt % VP-latex, 129 parts by weight of distilled water and 23.8 parts by weight of 28% ammonia water were added and aged at 25° C. for 20 hours to maintain a solid concentration of 19.05%.

After the adhesive liquid was applied and dried at 150° C. for 2 minutes, the cord was stretched and heat-treated at 240° C. for 60 seconds to shrink the nylon 6,6 yarn to be untwisted, and the aramid yarn was further lengthened by 10 mm/m to finish the adhesive treatment. The properties of the thus-prepared dip cords were evaluated and are shown in Table 5.

EXAMPLE 17

A raw cord and a dip cord were prepared in the same manner as in Example 16, except that aramid yarn was longer by 20 mm/m when it was untwisted by heat for 90 seconds. The properties of the thus-prepared dip cords were evaluated and are shown in Table 5.

EXAMPLE 18

A raw cord and a deep cord were prepared in the same manner as in Example 16 except that nylon 6,6 yarn (840D) and aramid yarn (1000D) were used. The properties of the thus-prepared dip cords were evaluated and are shown in Table 5.

EXAMPLE 19

A raw cord and a deep cord were prepared in the same manner as in Example 16 except that nylon 6,6 yarn 840D and aramid yarn 1000D were used and the aramid yarn was made longer by 20 mm/m when the yarn was untwisted by heat treatment of 90 seconds. The properties of the thus-prepared dip cords were evaluated and are shown in Table 5.

COMPARATIVE EXAMPLE 7

A raw cord and a deep cord were prepared in the same manner as in Example 16, except that the aramid yarn was inserted 10 mm/m longer at the time of yarn folding. The properties of the thus-prepared dip cords were evaluated and are shown in Table 5.

COMPARATIVE EXAMPLE 8

A raw cord and a deep cord were prepared in the same manner as in Example 16, except that nylon 6,6 yarn was inserted 15 mm/m longer at the time of yarn folding. The properties of the thus-prepared dip cords were evaluated and are shown in Table 5.

COMPARATIVE EXAMPLE 9

A raw cord and a deep cord were prepared in the same manner as in Example 16, except that nylon 6,6 yarn was inserted 20 mm/m longer at the time of yarn folding. The properties of the thus-prepared dip cords were evaluated and are shown in Table 5.

COMPARATIVE EXAMPLE 10

A raw cord and a deep cord were prepared in the same manner as in Example 16, except that nylon 6,6 yarn was inserted 25 mm/m longer at the time of yarn folding. The properties of the thus-prepared dip cords were evaluated and are shown in Table 5.

COMPARATIVE EXAMPLE 11

A raw cord and a deep cord were prepared in the same manner as in Example 16, except that nylon 6,6 yarn was inserted 30 mm/m longer at the time of yarn folding. The properties of the thus-prepared dip cords were evaluated and are shown in Table 5.

TABLE 5

| Division | Process cord properties | | | | | | Remarks |
|---|---|---|---|---|---|---|---|
| | strength (kg) | elongation at 6.8 kg (%) | shrinkage (%) | ES (%) | Fatigue resistance (%) | Adhesion strength (kg) | |
| Example 16 | 37.2 | 5.0 | 1.7 | 6.7 | 86.3 | 18.6 | |
| Example 17 | 37.0 | 5.5 | 1.5 | 7.0 | 89.2 | 19.2 | |
| Example 18 | 24.7 | 5.1 | 1.4 | 6.5 | 87.8 | 19.9 | |
| Example 19 | 24.3 | 5.6 | 1.2 | 6.8 | 85.9 | 18.8 | |
| Comparative Example 7 | 37.1 | 5.2 | 1.6 | 6.8 | 83.4 | 18.3 | ES is high, Fatigue resistance is low |
| Comparative Example 8 | 36.8 | 5.4 | 1.5 | 6.9 | 83.2 | 18.2 | ES is high, Fatigue resistance is low |
| Comparative Example 9 | 36.9 | 5.6 | 1.4 | 7.0 | 83.8 | 17.9 | ES is high, Fatigue resistance is low |
| Comparative Example 10 | 36.5 | 5.8 | 1.3 | 7.1 | 82.9 | 18.0 | ES is high, Fatigue resistance is low |
| Comparative Example 11 | 36.7 | 6.0 | 1.2 | 7.2 | 83.0 | 18.5 | ES is high, Fatigue resistance is low |

Referring to the test result of the above Table 5, in the case of the hybrid dip cord according to the present invention (Examples 16, 17, 18 and 19), it can be seen that when the nylon 6,6 yarn was used longer and untwisted, the fatigue resistance is improved as compared with the hybrid dip cord (Comparative Example 7) in which there is no the length difference between the nylon 6,6 yarn and the aramid yarn.

In addition, the hybrid dip cords in which nylon 6,6 yarns were used longer (Comparative Examples 8, 9, 10, and 11) are stronger in the strength but lower in the fatigue resistance than the hybrid dip cord according to the present invention.

EXAMPLE 20

A radial tire manufactured using the hybrid dip cord manufactured by Example 16 of the present invention as a cap ply has a carcass layer having a radially outer side ply turn-up, and the carcass layer is provided so as to include one layer. At this time, the specifications of the carcass cords were as shown in the following Table 6 and the carcass cords were aligned at an angle of 90 degrees with respect to the circumferential intermediate surface of the tire. The ply turn-up 34 has a height of 40 to 80% with respect to the maximum cross-sectional height of the tire. The bead portion 35 has a bead core 36 having 4 high strength steel wires having a diameter of 0.95 to 1.00 mm and a bead filler 37 having a shore A hardness of 40 or more. The belt 38 is reinforced by a belt reinforcing layer consisting of one layer of cap ply 39 and one layer of edge ply 44 at the top so that the cap ply cords in the cap ply 39 are parallel to the circumferential direction of the tire.

EXAMPLE 21

A tire was prepared in the same manner as in Example 20, except that the hybrid dip cord prepared in Example 17 was used as a cord material for tire production.

EXAMPLE 22

A tire was prepared in the same manner as in Example 20, except that the hybrid dip cord prepared in Example 18 was used as a cord material for tire production.

EXAMPLE 23

A tire was prepared in the same manner as in Example 20, except that the hybrid dip cord prepared in Example 19 was used as a cord material for tire production.

COMPARATIVE EXAMPLE 12

A tire was prepared in the same manner as in Example 20, except that the hybrid dip cord prepared in Comparative Example 7 was used as a cord material for tire production.

TABLE 6

|  |  | Example 20 | Example 21 | Example 22 | Example 23 | Comparative Example 12 |
|---|---|---|---|---|---|---|
| Carcass | material | PET | PET | PET | PET | PET |
|  | standard (d/twisted yarn) | 1500d/2 | 1500d/2 | 1500d/2 | 1500d/2 | 1500d/2 |
|  | Strength (Kg) | 24 | 24 | 24 | 24 | 24 |
|  | Modulus of elasticity (g/d) | 60 | 60 | 60 | 60 | 60 |
| Cap ply | material | Hybrid dip cord of Example 16 | Hybrid dip cord of Example 17 | Hybrid dip cord of Example 18 | Hybrid dip cord of Example 19 | Hybrid dip cord of Comparative Example 7 |
| Tire | Flatness ratio | 0.60 | 0.60 | 0.60 | 0.60 | 0.60 |
|  | Number of carcass layer | 1 | 1 | 1 | 1 | 1 |
|  | Number of cap ply layer | 1 | 1 | 1 | 1 | 1 |

EXAMPLE 24

A radial tire manufactured using the hybrid dip cord manufactured by Example 16 of the present invention has a carcass layer having a radially outer side ply turn-up, and the carcass layer is provided so as to include one layer. The specifications of the cap ply and carcass cord were as shown in Table 7 below, and tires were produced in the same manner as in Example 20.

EXAMPLE 25

A tire was prepared in the same manner as in Example 20, except that the hybrid dip cord prepared in Example 17 was used as a cord material for tire production.

EXAMPLE 26

A tire was prepared in the same manner as in Example 20, except that the hybrid dip cord prepared in Example 18 was used as a cord material for tire production.

EXAMPLE 27

A tire was prepared in the same manner as in Example 20, except that the hybrid dip cord prepared in Example 19 was used as a cord material for tire production.

COMPARATIVE EXAMPLE 13

A tire was prepared in the same manner as in Example 20, except that the hybrid dip cord prepared in Comparative Example 7 was used as a cord material for tire production.

TABLE 7

|  |  | Example 24 | Example 25 | Example 26 | Example 27 | Comparative Example 13 |
|---|---|---|---|---|---|---|
| Carcass | material | Hybrid dip cord of Example 16 | Hybrid dip cord of Example 17 | Hybrid dip cord of Example 18 | Hybrid dip cord of Example 19 | Hybrid dip cord of Comparative Example 7 |
| Cap ply | material standard (d/twisted yarn) | Nylon 6, 6 1260D/2P | Nylon 6, 6 1260D/2P | Nylon 6, 6 1260D/2P | Nylon 6, 6 1260D/2P | Nylon 6, 6 1260D/2P |
|  | strength (kg) | 22.4 | 22.4 | 22.4 | 22.4 | 22.4 |
| Tire | Flatness ratio | 0.60 | 0.60 | 0.60 | 0.60 | 0.60 |
|  | Number of carcass layer | 2 | 2 | 2 | 2 | 2 |
|  | Number of cap ply layer | 1 | 1 | 1 | 1 | 1 |

The 205/65 R15 V tire manufactured according to Examples 20, 21, 22, 23, 24, 25, 26, and 27 and Comparative Examples 12 and 13 was mounted on a 2000 cc class passenger car, and the noise generated in the vehicle while driving at 60 km/h was measured and the noise in the audio frequency range was expressed in dB. Further, the steering stability and riding comfortability were evaluated by the test course driving of trained drivers in 5 point units among 100 points. And the result was shown in Table 8 below. The durability was measured according to the P-metric tire endurance test method of FMVSS 109 at a temperature of 38° C., the tire load of 85, 90 and 100%, and a vehicle was driven for a total of 34 hours at the speed of 80 km/h. And it was judged as OK (OK) when no traces such as bead separation, cord cutting, belt separation, etc. were found in any part such as a tread, a sidewall, a carcass cord, an inner liner and a bead.

was more effective in noise reduction and steering stability than the comparative example 12 using the hybrid dip cord in which there is no length difference between the nylon 6,6 yarn and the aramid yarn, and the uniformity of the tire was also improved.

EXAMPLE 28

Nylon 6,6 and aramid fibers were obtained in the same manner as described above to produce tire reinforcing fibers. One twisted nylon 6,6 yarn (1260D) and one twisted aramid yarn (1500D) were twisted at 400 TPM, respectively, and they were twisted to give a twist of 400 TPM, to thereby prepare a raw cord. The nylon 6,6 yarn was used 10 mm/m longer. And then the raw cord passed through an adhesive liquid prepared by the following method to apply the adhesive liquid. A 2% stretch was applied during drying to prevent unevenness of the raw cord due to heat shrinkage.

29.4 wt % resorcinol 45.6 parts by weight; 255.5 parts by weight of distilled water; 37% formalin 20 parts by weight; and 3.8 parts by weight of 10 wt % sodium hydroxide were prepared and reacted at 25° C. for 5 hours with stirring, followed by adding the following elements:

300 parts by weight of 40 wt % VP-latex, 129 parts by weight of distilled water and 23.8 parts by weight of 28% ammonia water were added and aged at 25° C. for 20 hours to maintain a solid concentration of 19.05%.

After the adhesive liquid was applied and dried at 150° C. for 2 minutes, the cord was stretched and heat-treated at

TABLE 8

| Division | Weight of tire (kg) | riding comfortability | steering stability | durability | uniformity | noise (dB) |
|---|---|---|---|---|---|---|
| Example 20 | 9.54 | 100 | 100 | OK | 100 | 61.2 |
| Example 21 | 9.70 | 100 | 100 | OK | 100 | 61.4 |
| Example 22 | 9.55 | 100 | 100 | OK | 100 | 61.4 |
| Example 23 | 9.69 | 100 | 100 | OK | 100 | 61.3 |
| Comparative Example 12 | 9.60 | 96 | 95 | OK | 96 | 63.5 |
| Example 24 | 9.64 | 100 | 100 | OK | 100 | 60.4 |
| Example 25 | 9.70 | 100 | 100 | OK | 100 | 61.0 |
| Example 26 | 9.63 | 100 | 100 | OK | 100 | 60.3 |
| Example 27 | 9.71 | 100 | 100 | OK | 100 | 61.1 |
| Comparative Example 13 | 9.60 | 93 | 94 | OK | 92 | 64.3 |

In the test results of Table 8, it was shown that when the nylon 6,6 yarn was inserted longer into the cap ply, the tire 240° C. for 60 seconds to shrink the nylon 6,6 yarn so that the shrunk length becomes the same as that of the aramid yarn, and the adhesive treatment was terminated. The properties of the thus-prepared dip cords were evaluated and are shown in Table 9.

EXAMPLE 29

A hybrid dip cord was prepared in the same manner as in Example 28 except that the fineness of the aramid yarn was 1000 denier and the fineness of the nylon 6,6 yarn was 840 denier. The properties of the thus-prepared dip cords were evaluated and are shown in Table 9.

EXAMPLE 30

The raw cord and dip cord were prepared in the same manner as in Example 28, except that the nylon 6,6 yarn was inserted 20 mm/m longer and heat-treated for 70 seconds. The properties of the thus-prepared dip cords were evaluated and are shown in Table 9.

TPM to one aramid (1500D), a twist of 400 TPM was applied to the one pre-twisted aramid yarn (1500D) and one non-twisted nylon yarn 6,6 yarn (1260D) to thereby produce a primarily twisted yarn, and then the primarily twisted yarn was cabled while inputting the same length of the aramid yarn and the nylon 6,6. The properties of the thus-prepared dip cords were evaluated and are shown in Table 9.

COMPARATIVE EXAMPLE 15

During the twisting process for the production of raw cord, the hybrid dip cords were manufactured in the same manner as in Example 28 except that one twisted nylon 6,6 yarn (1260D) and one aramid yarn (1500D) were twisted at 400 TPM, respectively, to produce a ply twist yarn, and the aramid yarns and the nylon 6,6 yarns were inserted in the same length. The properties of the thus-prepared dip cords were evaluated and are shown in Table 9.

TABLE 9

| | Process cord properties | | | | | |
| --- | --- | --- | --- | --- | --- | --- |
| | strength (kg) | elongation at 6.8 kg (%) | shrinkage (%) | ES (%) | Fatigue resistance (%) | Remarks |
| Example 28 | 40.5 | 3.8 | 1.1 | 4.9 | 70.8 | |
| Example 29 | 26.8 | 3.6 | 1.1 | 4.7 | 71.2 | |
| Example 30 | 41.1 | 3.5 | 1.3 | 4.8 | 68.8 | |
| Example 31 | 40.7 | 3.2 | 1.5 | 4.7 | 67.2 | |
| Example 32 | 41.3 | 3.0 | 1.6 | 4.6 | 65.0 | |
| Comparative Example 14 | 35.4 | 5.0 | 1.7 | 6.7 | 72.1 | |
| Comparative Example 15 | 36.3 | 4.6 | 1.8 | 6.4 | 71.2 | Fatigue resistance is low |

EXAMPLE 31

The raw cord and dip cord were prepared in the same manner as in Example 28, except that the nylon 6,6 yarn was inserted 30 mm/m longer and heat-treated for 80 seconds. The properties of the thus-prepared dip cords were evaluated and are shown in Table 9.

EXAMPLE 32

The raw cord and dip cord were prepared in the same manner as in Example 28, except that the nylon 6,6 yarn was inserted 40 mm/m longer and heat-treated for 90 seconds. The properties of the thus-prepared dip cords were evaluated and are shown in Table 9.

COMPARATIVE EXAMPLE 14

During the twisting process for the production of raw cord, a hybrid dip cord was prepared in the same manner as in Example 28 except that after applying a pre-twist of 40

Referring to the experimental result of the above Table 9, in the case of the hybrid dip cord according to the present invention (Examples 28, 29, 30, 31 and 32), the strength of the hybrid dip cord according to the present invention is improved compared to the hybrid dip cord prepared according to the comparative examples.

EXAMPLE 33

A radial tire manufactured using the hybrid dip cord manufactured by Example 28 of the present invention as a cap ply has a carcass layer having a radially outer side ply turn-up, and the carcass layer is provided so as to include one layer. At this time, the specifications of the carcass cords were as shown in the following Table 10 and the carcass cords were aligned at an angle of 90 degrees with respect to the circumferential intermediate surface of the tire. The ply turn-up 34 has a height of 40 to 80% with respect to the maximum cross-sectional height of the tire. The bead portion 35 has a bead core 36 having 4 high strength steel wires having a diameter of 0.95 to 1.00 mm and a bead filler 37 having a shore A hardness of 40 or more. The belt 38 is reinforced by a belt reinforcing layer consisting of one layer of cap ply 39 and one layer of edge ply 44 at the top so that the cap ply cords in the cap ply 39 are parallel to the circumferential direction of the tire.

EXAMPLE 34

A tire was prepared in the same manner as in Example 32, except that the hybrid dip cord prepared in Example 29 was used as a cord material for tire production.

EXAMPLE 35

A tire was prepared in the same manner as in Example 32, except that the hybrid dip cord prepared in Example 30 was used as a cord material for tire production.

EXAMPLE 36

A tire was prepared in the same manner as in Example 32, except that the hybrid dip cord prepared in Example 31 was used as a cord material for tire production.

EXAMPLE 37

A tire was prepared in the same manner as in Example 32, except that the hybrid dip cord prepared in Example 32 was used as a cord material for tire production.

COMPARATIVE EXAMPLE 16

A tire was prepared in the same manner as in Example 32, except that the hybrid dip cord prepared in Comparative Example 14 was used as a cord material for tire production.

COMPARATIVE EXAMPLE 17

A tire was prepared in the same manner as in Example 32, except that the hybrid dip cord prepared in Comparative Example 15 was used as a cord material for tire production.

EXAMPLE 38

A radial tire manufactured using the hybrid dip cord manufactured by Example 28 of the present invention in the carcass layer has a carcass layer having a radially outer side ply turn-up, and the carcass layer is provided so as to include one layer. The specifications of the cap ply and carcass cord were as shown in Table 11 below, and tires were produced in the same manner as in Example 33.

EXAMPLE 39

A tire was prepared in the same manner as in Example 33, except that the hybrid dip cord prepared in Example 29 was used as a cord material for tire production.

EXAMPLE 40

A tire was prepared in the same manner as in Example 33, except that the hybrid dip cord prepared in Example 30 was used as a cord material for tire production.

EXAMPLE 41

A tire was prepared in the same manner as in Example 33, except that the hybrid dip cord prepared in Example 31 was used as a cord material for tire production.

EXAMPLE 42

A tire was prepared in the same manner as in Example 33, except that the hybrid dip cord prepared in Example 32 was used as a cord material for tire production.

COMPARATIVE EXAMPLE 18

A tire was prepared in the same manner as in Example 33, except that the hybrid dip cord prepared in Comparative Example 14 was used as a cord material for tire production.

TABLE 10

| | | Example 33 | Example 34 | Example 35 | Example 36 | Example 37 | Comparative Example 16 | Comparative Example 17 |
|---|---|---|---|---|---|---|---|---|
| Carcass | material | Polyethylene terephthalate | Polyethylene terephthalate | Polyethylene terephthalate | Polyethylene terephthalate | Polyethylene terephthalate | Polyethylene terephthalate | Polyethylene terephthalate |
| | standard (d/twisted yarn) | 1500d/2 | 1500d/2 | 1500d/2 | 1500d/2 | 1500d/2 | 1500d/2 | 1500d/2 |
| | Strength (Kg) | 24 | 24 | 24 | 24 | 24 | 24 | 24 |
| | Modulus of elasticity (g/d) | 60 | 60 | 60 | 60 | 60 | 60 | 60 |
| Cap ply | material | Hybrid dip cord of Example 28 | Hybrid dip cord of Example 29 | Hybrid dip cord of Example 30 | Hybrid dip cord of Example 31 | Hybrid dip cord of Example 32 | Hybrid dip cord of Comparative Example 14 | Hybrid dip cord of Comparative Example 15 |
| Tire | Flatness ratio | 0.60 | 0.60 | 0.60 | 0.60 | 0.60 | 0.60 | 0.60 |
| | Number of carcass layer | 1 | 1 | 1 | 1 | 1 | 1 | 1 |
| | Number of cap ply layer | 1 | 1 | 1 | 1 | 1 | 1 | 1 |

COMPARATIVE EXAMPLE 19

A tire was prepared in the same manner as in Example 33, except that the hybrid dip cord prepared in Comparative Example 14 was used as a cord material for tire production.

TABLE 11

| | | Example 38 | Example 39 | Example 40 | Example 41 | Example 42 | Comparative Example 18 | Comparative Example 19 |
|---|---|---|---|---|---|---|---|---|
| Carcass | Material | Hybrid dip cord of Example 28 | Hybrid dip cord of Example 29 | Hybrid dip cord of Example 30 | Hybrid dip cord of Example 31 | Hybrid dip cord of Example 32 | Hybrid dip cord of Comparative Example 14 | Hybrid dip cord of Comparative Example 15 |
| Cap ply | Metarial | Nylon 6, 6 | Nylon 6, 6 | Nylon 6, 6 | Nylon 6, 6 | Nylon 6, 6 | Nylon 6, 6 | Nylon 6, 6 |
| | standard (d/twisted yarn) | 1260d/2 | 1260d/2 | 1260d/2 | 1260d/2 | 1260d/2 | 1260d/2 | 1260d/2 |
| | strength (kg) | 22.4 | 22.4 | 22.4 | 22.4 | 22.4 | 22.4 | 22.4 |
| | Modulus of elasticity (g/d) | 50 | 50 | 50 | 50 | 50 | 50 | 50 |
| Tire | Flatness ratio | 0.60 | 0.60 | 0.60 | 0.60 | 0.60 | 0.60 | 0.60 |
| | Number of carcass layer | 1 | 1 | 1 | 1 | 1 | 1 | 1 |
| | Number of cap ply layer | 1 | 1 | 1 | 1 | 1 | 1 | 1 |

The 205/65 R15 V tire manufactured according to Examples 33 to 42 and Comparative Examples 16 to 19 was mounted on a 2000 cc class passenger car, and the noise generated in the vehicle while driving at 60 km/h was measured and the values in the audible frequency range were expressed in dB. Further, the steering stability and riding comfortability were evaluated in 5-point units among 100 points by the test-course driving of a skilled driver, and the results are shown in Table 4 below. The durability was measured according to the P-metric tire endurance test method of FMVSS 109 at a temperature of 38° C., the tire load of 85, 90 and 100%, and a vehicle was driven for a total of 34 hours at the speed of 80 km/h. And it was judged as OK (OK) when no traces such as bead separation, cord cutting, belt separation, etc. were found in any part such as a tread, a sidewall, a carcass cord, an inner liner and a bead.

TABLE 12

| Division | Weight of tire (kg) | riding comfortability | steering stability | durability | uniformity | noise (dB) |
|---|---|---|---|---|---|---|
| Example 33 | 9.98 | 100 | 100 | OK | 100 | 60.4 |
| Example 34 | 9.98 | 100 | 100 | OK | 100 | 60.4 |
| Example 35 | 9.99 | 100 | 100 | OK | 100 | 60.5 |
| Example 36 | 10.02 | 100 | 100 | OK | 100 | 61.2 |
| Example 37 | 10.1 | 100 | 100 | OK | 100 | 61 |
| Comparative Example 16 | 10.01 | 97 | 96 | OK | 92 | 62 |
| Comparative Example 17 | 10.08 | 94 | 95 | OK | 93 | 62.1 |
| Example 38 | 10.2 | 100 | 100 | OK | 100 | 60.4 |
| Example 39 | 10.2 | 100 | 100 | OK | 100 | 60.3 |
| Example 40 | 10.12 | 100 | 100 | OK | 100 | 60.4 |
| Example 41 | 10.0 | 100 | 100 | OK | 100 | 60.6 |
| Example 42 | 10.21 | 100 | 100 | OK | 100 | 60.6 |
| Comparative Example 18 | 10.5 | 95 | 97 | OK | 94 | 61.5 |
| Comparative Example 19 | 10.6 | 95 | 94 | OK | 93 | 63 |

Referring to the test results of Table 12, the tires using the hybrid cord (Examples 33 to 42) according to the present invention were more effective in noise reduction and steering stability than Comparative Examples 16 to 19, and the uniformity of tires has also been improved.

DESCRIPTION OF SYMBOLS

| | |
|---|---|
| 1: pack | 2: nozzle |
| 3: cooling zone | 4: discharged yarn |
| 5: emulsion-supplying unit | |
| 6, 7, 8, 9, 10: stretching roller | |
| 11: final stretched yarn | |
| 31: tire | 32: carcass layer |
| 33: carcass layer reinforcement cord | 34: ply turn-up |
| 35: bead region | 36: bead core |
| 37: bead filler | 38: belt structure |
| 39: cap ply | 40: belt ply |
| 41, 42: belt cord | 43: tread |
| 44: edge ply | 45: cap ply cord |

The invention claimed is:

1. A method of manufacturing a hybrid dip cord for a radial pneumatic tire, the method comprising:

a step of producing a primarily twisted yarn by applying the same twist number in the range of 200 to 500 TPM twist respectively to one nylon 6,6 yarn or nylon 6 yarn and one aramid yarn;

a step of producing a raw cord by applying 200 to 500 TPM twist by cabling the primarily twisted yarn as two yarns; and a step of producing a dip cord by immersing the raw cord in a dipping solution and then heat-treating the raw cord to heat-shrink the nylon 6,6 yarn or the nylon 6 yarn so that the length of the nylon 6,6 yarn or the nylon 6 yarn is shorter than that of the aramid yarn wherein the nylon 6,6 yarn or the nylon 6 yarn and the aramid yarn are pre-twisted and cabled simultaneously at a direct cabler, wherein when the dip cord is untwisted, the aramid yarn is 10 to 30 mm/m longer than the nylon 6,6 yarn or nylon 6 yarn, and wherein a strength of the dip cord is 24.7 kg to 37.2 kg.

2. The method of claim 1, wherein the shrinking of the nylon 6,6 or nylon 6 yarns in the heat treatment step uses one selected from the group consisting of a method of controlling the tension applied to the raw cord, a method of adjusting the heat treatment temperature, and a method of controlling the heat treatment time.

3. The method of claim 2, wherein the tension is controlled through a speed of a feed roller and a speed of a winding roller, the heat treatment temperature is 130 to 240° C., and the heat treatment time is 50 to 90 seconds.

4. The method of claim 1, wherein the fineness of nylon 6,6 or nylon 6 yarn and aramid yarn is 500 to 3000 denier, respectively.

* * * * *